United States Patent
Nishira et al.

(10) Patent No.: US 8,219,298 B2
(45) Date of Patent: Jul. 10, 2012

(54) LANE CHANGE ASSIST SYSTEM

(75) Inventors: Hikaru Nishira, Yokohama (JP);
Taketoshi Kawabe, Fukuoka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1730 days.

(21) Appl. No.: 11/125,389

(22) Filed: May 10, 2005

(65) Prior Publication Data

US 2005/0256630 A1  Nov. 17, 2005

(30) Foreign Application Priority Data

May 17, 2004  (JP) ................. 2004-146299

(51) Int. Cl.
*B60T 7/12* (2006.01)
*G05D 1/00* (2006.01)
*G06F 7/00* (2006.01)
*G06F 17/00* (2006.01)

(52) U.S. Cl. ................. 701/96; 701/1; 701/93
(58) Field of Classification Search ............. 701/1, 29, 701/41, 93, 96, 300, 301; 340/436, 438, 340/903, 933, 169, 435; 348/118; 182/104, 182/181; 250/208.1; 315/77; 180/169
See application file for complete search history.

(56) References Cited

U.S. PATENT DOCUMENTS

| | | | | |
|---|---|---|---|---|
| 5,235,316 A * | 8/1993 | Qualizza | ................ | 340/436 |
| 5,309,137 A * | 5/1994 | Kajiwara | ................ | 340/436 |
| 5,521,579 A * | 5/1996 | Bernhard | ................ | 340/438 |
| 5,652,705 A * | 7/1997 | Spiess | ................ | 701/117 |
| 5,734,336 A * | 3/1998 | Smithline | ................ | 340/903 |
| 5,767,793 A * | 6/1998 | Agravante et al. | ................ | 340/903 |
| 5,832,400 A * | 11/1998 | Takahashi et al. | ................ | 701/53 |
| 5,850,176 A * | 12/1998 | Kinoshita et al. | ................ | 340/435 |
| 5,871,062 A * | 2/1999 | Desens et al. | ................ | 180/169 |
| 5,899,289 A * | 5/1999 | Uematsu | ................ | 180/168 |
| 5,955,967 A * | 9/1999 | Yamada | ................ | 340/904 |
| 5,999,874 A * | 12/1999 | Winner et al. | ................ | 701/93 |
| 6,304,811 B1 * | 10/2001 | Prestl | ................ | 701/96 |
| 6,353,788 B1 * | 3/2002 | Baker et al. | ................ | 701/96 |
| 6,400,308 B1 * | 6/2002 | Bell et al. | ................ | 342/71 |
| 6,401,024 B1 * | 6/2002 | Tange et al. | ................ | 701/96 |

(Continued)

FOREIGN PATENT DOCUMENTS

EP  1 332 910 A1  8/2003

(Continued)

OTHER PUBLICATIONS

Genesis II Directional, Technical Specification, Jul. 2003, Internet, p. 1-6.*

*Primary Examiner* — Khoi Tran
*Assistant Examiner* — Bhavesh V Amin
(74) *Attorney, Agent, or Firm* — Foley & Lardner LLP

(57) ABSTRACT

A lane change assist system is comprised of a host vehicle state detecting device that detects a host vehicle traveling condition, a surrounding vehicle detecting device that detects other vehicle located around the host vehicle, a lane detecting device that detects a lane around the host vehicle, and a processing unit. The processing unit is arranged to set a target lane, to determine a period of a lane change assist, to set a predicted period for an evaluation of a lane change to the target lane based on a prediction, to obtain an appropriate speed range during the predicted period for each gap, and to select a target vehicle speed from the appropriate speed range.

16 Claims, 19 Drawing Sheets

U.S. PATENT DOCUMENTS

| | | | | |
|---|---|---|---|---|
| 6,560,525 B1* | 5/2003 | Joyce et al. | ...................... | 701/96 |
| 6,665,614 B2* | 12/2003 | Sekiguchi | ...................... | 701/301 |
| 6,670,910 B2* | 12/2003 | Delcheccolo et al. | ........... | 342/70 |
| 6,708,099 B2* | 3/2004 | Tellis et al. | ...................... | 701/96 |
| 6,753,766 B2* | 6/2004 | Patchell | ........................ | 340/436 |
| 6,873,911 B2* | 3/2005 | Nishira et al. | ................ | 701/301 |
| 7,038,577 B2* | 5/2006 | Pawlicki et al. | .............. | 340/435 |
| 7,085,633 B2* | 8/2006 | Nishira et al. | ................... | 701/36 |
| 7,274,988 B2* | 9/2007 | Mukaiyama | ................. | 701/301 |
| 7,363,140 B2* | 4/2008 | Ewerhart et al. | ................ | 701/96 |
| 7,463,138 B2* | 12/2008 | Pawlicki et al. | .............. | 340/435 |
| 2002/0126002 A1* | 9/2002 | Patchell | ........................ | 340/436 |
| 2003/0135318 A1* | 7/2003 | Tellis et al. | ..................... | 701/96 |
| 2003/0195704 A1* | 10/2003 | Sekiguchi | ..................... | 701/301 |
| 2004/0016870 A1* | 1/2004 | Pawlicki et al. | ............ | 250/208.1 |
| 2004/0044460 A1* | 3/2004 | Kikuchi | ........................... | 701/93 |
| 2004/0107030 A1* | 6/2004 | Nishira et al. | .................. | 701/36 |
| 2004/0148063 A1* | 7/2004 | Patchell | ............................ | 701/1 |
| 2006/0206243 A1* | 9/2006 | Pawlicki et al. | .................. | 701/1 |

FOREIGN PATENT DOCUMENTS

| | | |
|---|---|---|
| JP | 10-44827 A | 2/1998 |
| JP | 2000-135934 A | 5/2000 |
| JP | 2002-307973 A | 10/2002 |
| JP | 2003-025868 A | 1/2003 |
| JP | 2003-228800 A | 8/2003 |

* cited by examiner

LANE CHANGE ASSIST SYSTEM

BACKGROUND OF THE INVENTION

The present invention relates to a lane change assist system for assisting a lane change of a vehicle and a method thereof.

Japanese Published Patent Application No. 2003-25868 discloses a lane change assist system which facilitates an entering to an adjacent target lane from a present traveling lane and avoids a radical deceleration on the target lane. This lane change assist system is arranged to control a host vehicle speed at a representative vehicle speed of adjacent vehicles on the target lane, to select one adjacent vehicle whose distance to the host vehicle is the smallest distance to a target inter-vehicle distance which is shorter than an inter-vehicle distance set on the target lane as a preceding vehicle on the target lane, and to start a cruise control relative to the newly selected preceding vehicle when a driver manipulates a lane change switch.

SUMMARY OF THE INVENTION

However, since this known lane change assist system is arranged to bring the host vehicle speed closer to the adjacent vehicle speed on the target lane before the execution of the lane change, there is a problem that the assist of controlling the host vehicle speed at the vehicle speed of the adjacent vehicle is not an effective assist in a situation that it is difficult to ensure a space margin for controlling the host vehicle to the adjacent vehicle speed of the adjacent vehicle on the target lane due to the existence of a preceding vehicle ahead of the host vehicle on the present traveling lane or that a difference between the host vehicle speed and the adjacent vehicle speed is very small. Further, in a situation that a plurality of adjacent vehicles are traveling on the target lane while separately having various inter-vehicle distances and vehicle speeds, respectively, it is difficult to obtain the adjacent vehicle speed uniformly.

It is therefore an object of the present invention to provide a lane change assist system which provides an effective lane change assist even when the difference between the host vehicle and other vehicles on an adjacent target lane is small.

An aspect of the present invention resides in a lane change assist system which comprises: a host vehicle state detecting device that detects a traveling condition of a host vehicle; a surrounding vehicle detecting device that detects other vehicle located around the host vehicle; a lane detecting device that detects a lane around the host vehicle; and a processing unit that is arranged to set a target lane to which the host vehicle change a traveling lane from the detected lane, to determine a start and an ending of a lane change assist, to set a predicted period for an evaluation of a lane change to the target lane, on the basis of a prediction, to obtain an appropriate speed range in which the host vehicle is capable of executing the lane change during the predicted period for each of gaps between other vehicles traveling on the target lane, and to select a target vehicle speed of the host vehicle from the appropriate speed range.

Another aspect of the present invention resides in a method of assisting a lane change of a host vehicle, which comprises: an operation of detecting a traveling condition of a host vehicle; an operation of detecting other vehicle located around the host vehicle; an operation of detecting a lane around the host vehicle; an operation of executing a setting of a target lane to which the host vehicle moves and a determination of a start and an ending of a lane change assist; an operation of setting a predicted period for an evaluation of a lane change to the target lane on the basis of a prediction; an operation of obtaining an appropriate speed range in which the host vehicle is capable of executing the lane change during the predicted period for each of gaps between other vehicles traveling on the target lane; and selecting a target vehicle speed of the host vehicle from the appropriate speed range.

The other objects and features of this invention will become understood from the following description with reference to the accompanying drawings.

DETAILED DESCRIPTION OF THE INVENTION

Figure 1:
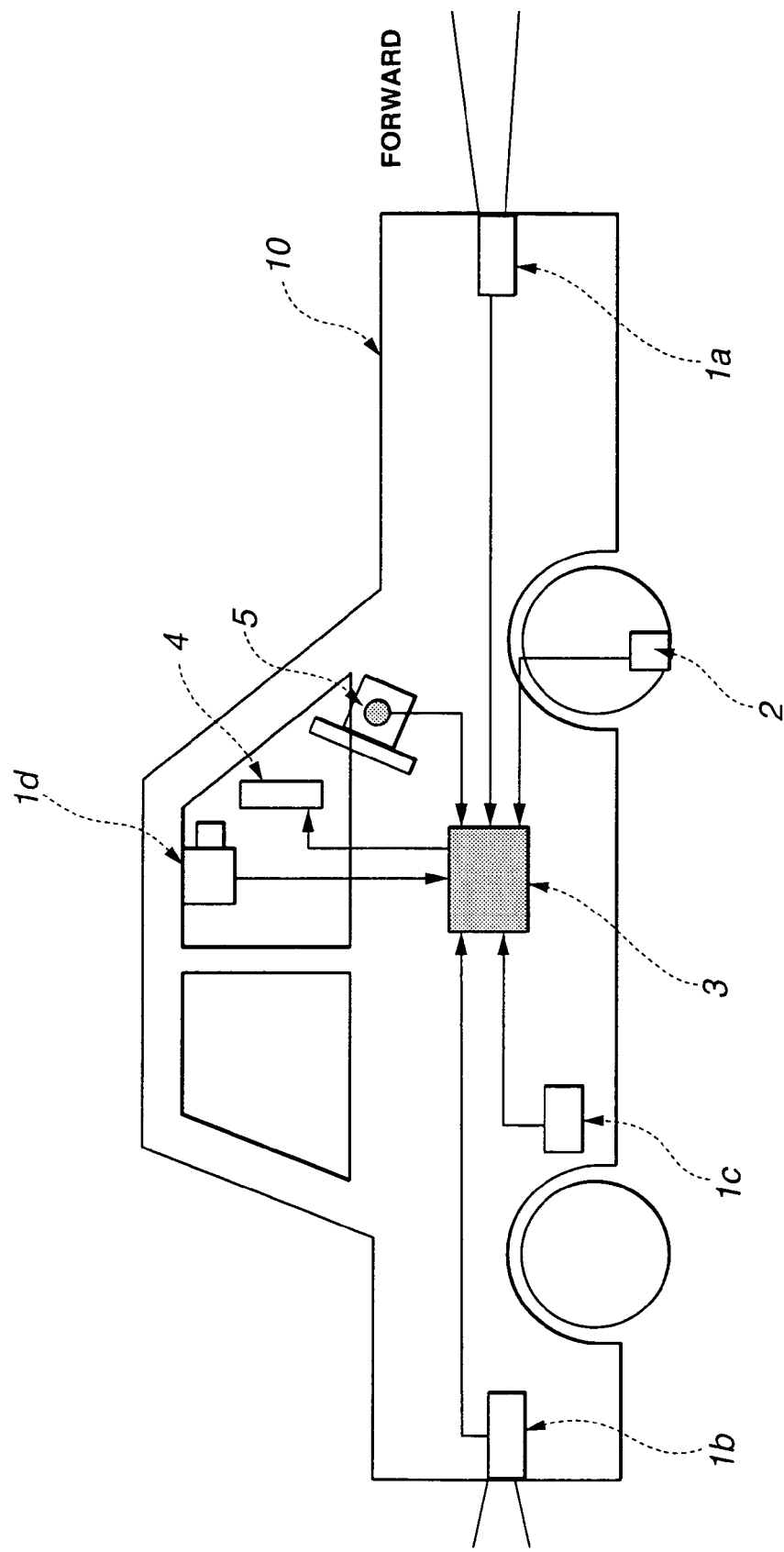
FIG. 1 is a schematic view showing a vehicle equipped with a lane change assist system of a first embodiment according to the present invention.

Hereinafter, there is discussed embodiments according to the present invention with reference to the drawings. In the drawings, elements having the same function is denoted by the same reference numeral and the explanation thereof is omitted herein.

First Embodiment

Referring to FIGS. 1 through 12, there is discussed a first embodiment of a lane change assist system and a method thereof.

FIG. 1 is a schematic view of the lane change assist system, which a host vehicle 10 is equipped with. The lane change assist system comprises a forward radar 1a, a rearward radar 1b, a sideward sensor 1c, a lane marker (white line) sensor 1d, a vehicle speed sensor 2, a processing unit 3, a display unit 4, and a turn indicator 5.

Forward radar 1a is installed at a front portion of host vehicle 10 and measures distances of a plurality of vehicles ahead of host vehicle 10. Rearward radar 1b is installed at a rear portion of host vehicle 10 and measures distances of a plurality of vehicles at the back of host vehicle 10. Sideward sensors 1c are installed at left and right sides of host vehicles, respectively and detect a position of an adjacent vehicle located sideward of host vehicle 10. A radar may be employed as sideward sensors 1c, and an ultrasonic sensor or image sensor may be employed as sideward sensors 1c. These surrounding sensors 1a through 1c function as surrounding vehicle detecting means. Lane marker sensor 1d is constructed by a CCD (charge-coupled device) camera. Lane marker sensor 1d is installed at a front proper portion of host vehicle 10 and detects white lines (lane markers) drawn on a road around host vehicle 10. Lane marker sensor 1d functions as lane detecting means and recognizes a traveling lane from the detected lane markers.

Vehicle speed sensor 2 is one of vehicle state detecting means and is constructed by installing a rotary encoder at a wheel of host vehicle 10. Vehicle speed sensor 2 generates a cyclic pulse train according to a revolution speed of the wheel and calculates a vehicle speed of host vehicle 10 from the outputted pulse train.

Processing unit 3 is constructed by a microcomputer and peripheral devices thereof and processes signals outputted from sensors 1a, 1b, 1c, 1d and 2 by executing programs stored in internal memories thereof. The calculation result based on the signals is sent to display unit 4.

Display unit 4 is constructed by a display processing circuit and a display such as a liquid crystal panel, and displays assist information sent from processing 3. Display unit 4 further comprises a speaker and provides the assist information in the form of sound by replaying previously recorded sounds through the speaker.

Turn indicator 5 comprises a lever which is cable of being selectively placed at a right turn position, a left turn position and a neutral position through a driver's manipulation. By placing the lever at right turn position or left turn position, turn indicator 5 is lighted up and sends the driver's turn intent and a direction of the changed lance to processing unit 3.

Figure 2:
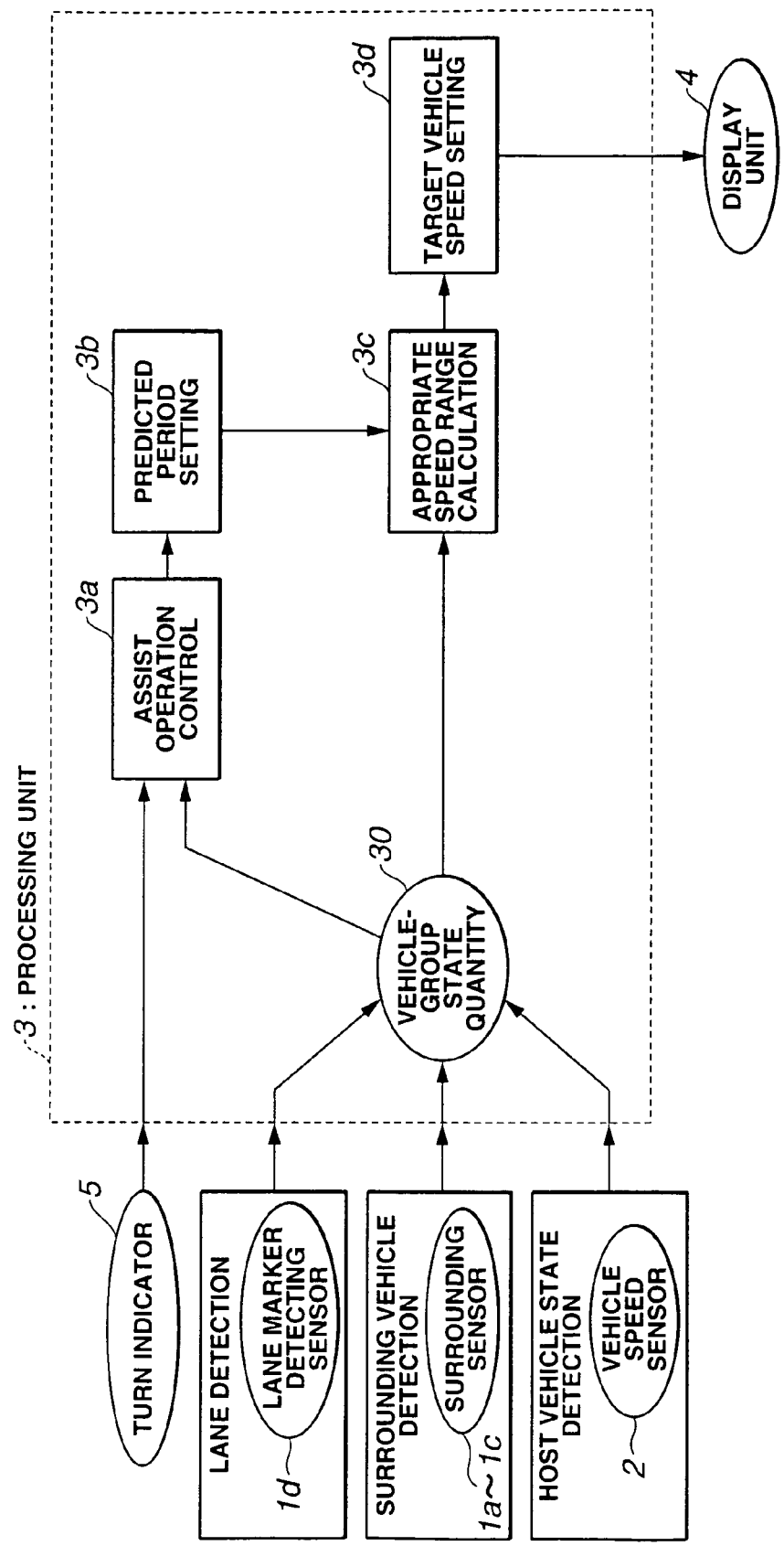
FIG. 2 is a block diagram showing a functional construction of the lane change assist system of the first embodiment.
Figure 3:
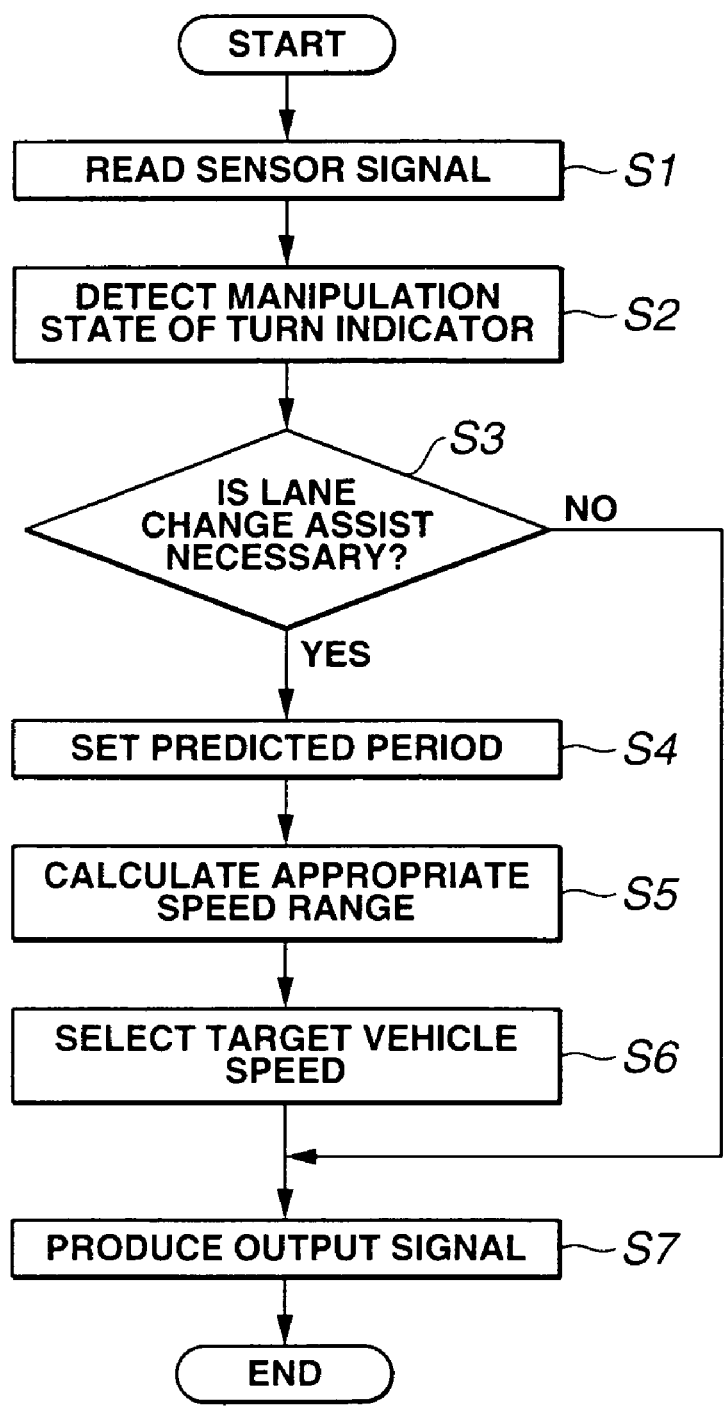
FIG. 3 is a flowchart showing a processing executed at a processing unit of the lane change assist system of the first embodiment.

Processing unit 3 is constructed by blocks 3a, 3b, 3c and 3d shown in FIG. 2, in the form of software and executes the processing through the execution of a flowchart shown in FIG. 3.

As shown in FIG. 2, processing unit 3 comprises an assist operation controlling means 3a, a prediction interval setting means 3b, an appropriate speed range calculating means 3c and a target speed setting means 3d. A reference numeral 30 denotes a vehicle-group state quantity which is a signal sent from lane marker sensor 1d functioning as a lane detecting means, surrounding vehicle detecting sensors 1a through 1c functioning as a surrounding vehicle detecting means, and vehicle speed sensor 2 functioning as a host vehicle state detecting means.

Hereinafter there is discussed a content of the processing executed at each block of processing unit 3, on the basis of the operation under a situation shown in FIG. 4.

Figure 4:
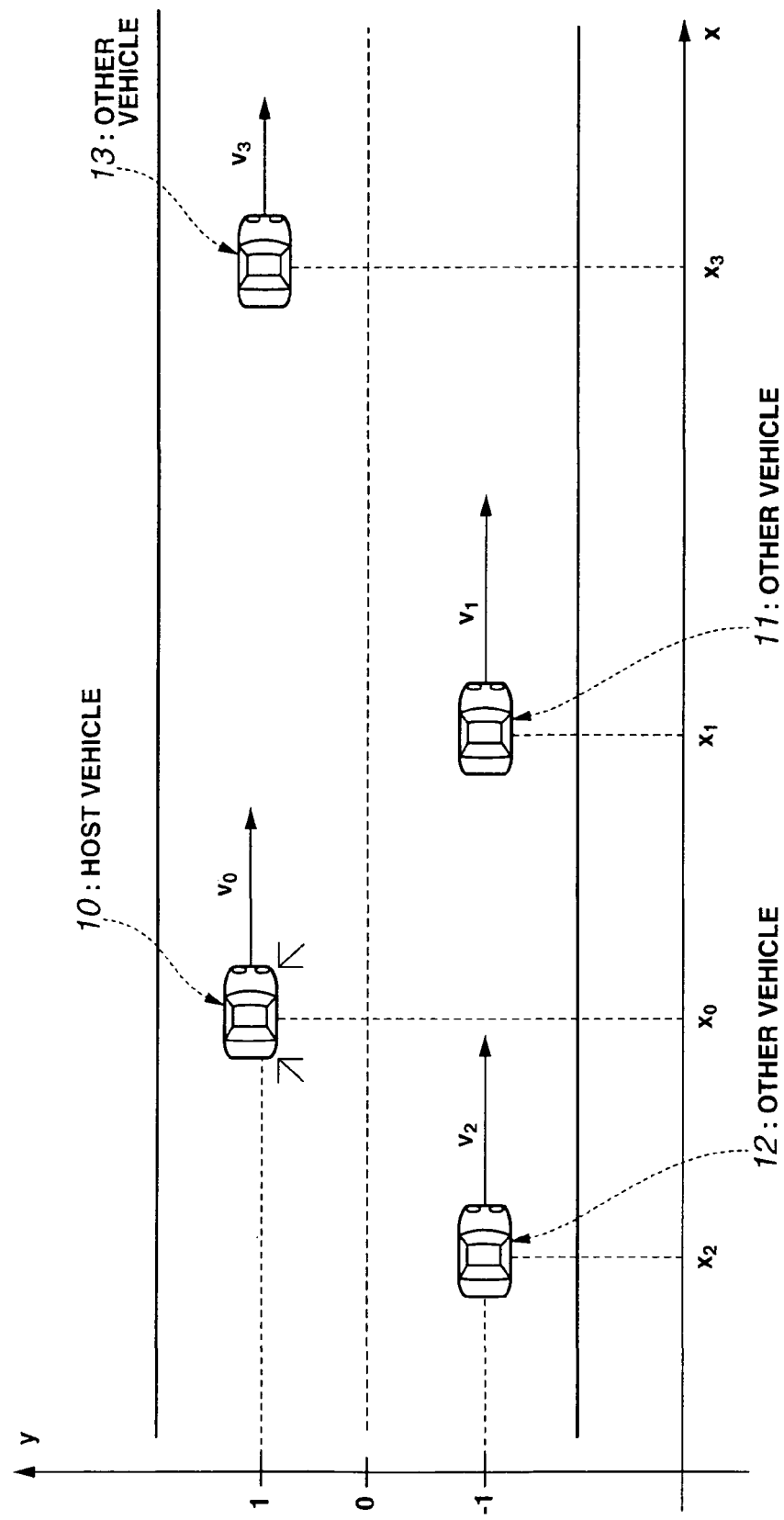
FIG. 4 is a view showing a situation in which a host vehicle equipped with the lane change assist system of the first embodiment is encountered.

FIG. 4 represents a situation that two other vehicles 11 and 12 are traveling on a right lane of a one-side two-lane road and host vehicle 10 and one other vehicle 13 ahead of host vehicle 10 is traveling on a left lane of the road. Under this situation, the driver of host vehicle 10 intended to execute a lane change from the left lane to the right lane and manipulates turn indicator 5 to turn on a right turn lamp, but the driver hesitated to execute the lane change due to the existence of other vehicles 11 and 12 on the right lane.

A coordinate system employed in FIG. 4 is constructed by an x-axis which extends along the traveling direction of vehicles 10 through 13 and on the lane marker (white line) of separating the right and left lanes and a y-axis which is normalized such that an origin of the coordinate system is positioned on the lane marker, a center of the left lane is 1 and a center of the right lane is −1. In this coordinate system, x-coordinates of vehicles 10, 11, 12 and 13 are represented by $x_0$, $x_1$, $x_2$, and $x_3$, respectively. Vehicle speeds of vehicles 10, 11, 12 and 13 are represented by $v_0$, $v_1$, $v_2$, and $v_3$, respectively. y-coordinates of vehicles 10, 11, 12 and 13 are represented by $y_0$, $y_1$, $y_2$, and $y_3$, respectively.

Processing unit 3 executes the processing represented by the flowchart shown in FIG. 3 at predetermined time intervals.

At step S1 processing unit 3 reads the signals detected by sensors 1a through 1d and 2 and stores them in its memory. The surrounding information of the read signal is converted in the coordinate system shown in FIG. 4 and stored in a memory of processing unit 3. More specifically, the y-coordinate $y_0$ of host vehicle 10 is determined on the basis of the signal obtained by lane marker sensor 1d. The y-coordinates $y_1$, $y_2$ and $y_3$ of other vehicles 11 through 13 are determined on the basis of lateral-directional relative positional differences of other vehicles 11 through 13 relative to host vehicle 10, which differences are the signals obtained by surrounding sensors 1a through 1c. Further, the x-coordinates $x_1$, $x_2$ and $x_3$ of other vehicles 11 through 13 are determined on the basis of inter-vehicle distances of other vehicles 11 through 13 relative to host vehicle 10, which distances are the signals obtained by surrounding sensors 1a through 1c, and the x-coordinate $x_0$ of host vehicle 10. The vehicle speeds $v_1$, $v_2$ and $v_3$ of other vehicles 11 through 13 are determined by adding host vehicle speed $v_0$ to the respective relative speeds of other vehicles 11 through 13 which are obtained from surrounding sensors 1a through 1c. The obtained information is stored as vehicle-group state quantity 30 of the surrounding vehicles.

At step S2 processing unit 3 reads a signal indicative of a manipulated state of turn indicator 5. Since turn indicator 4 is manipulated to turn on the right turn lamp in the situation shown in FIG. 4, the information indicative of the right turn state is stored in the memory of processing unit 3.

Figure 5:
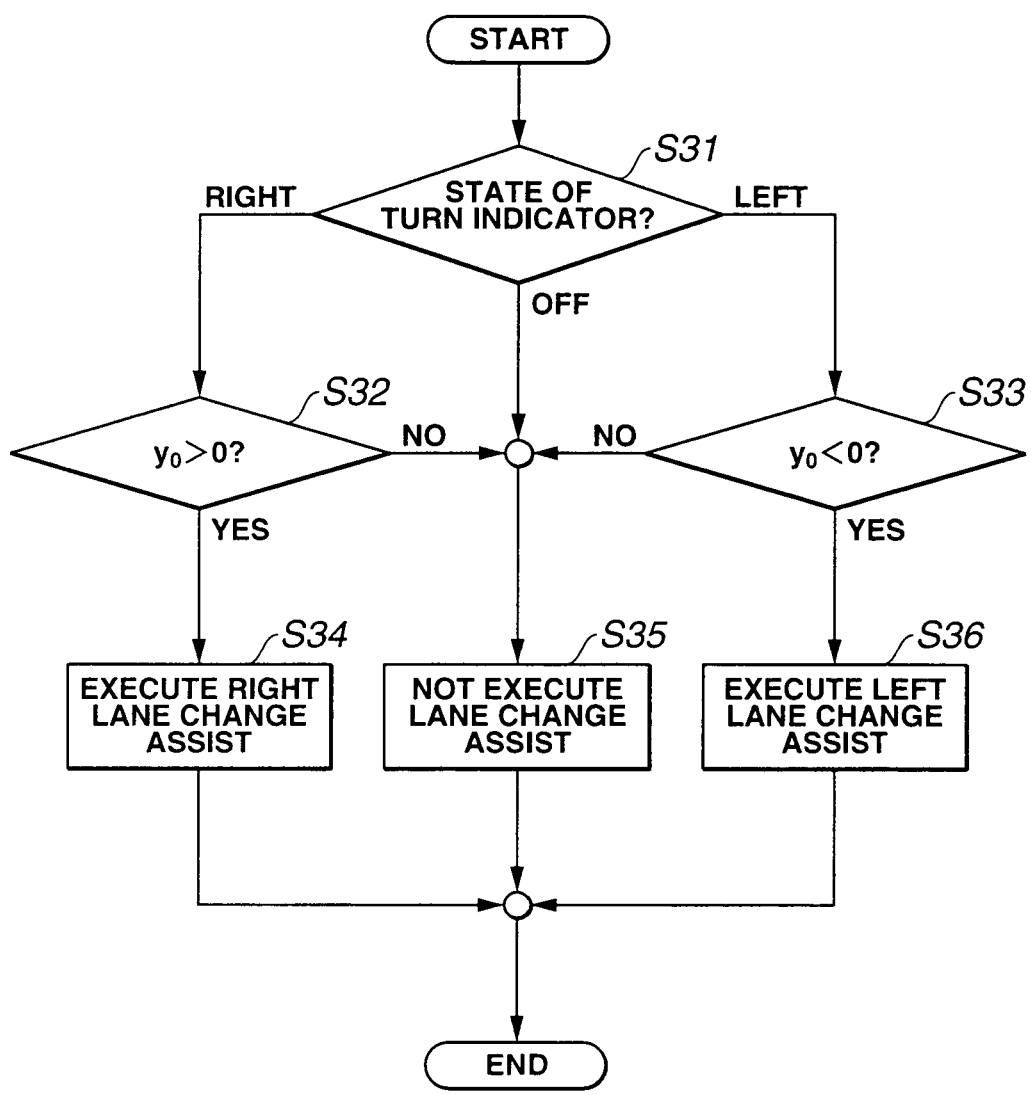
FIG. 5 is a flowchart showing a processing for controlling an assist operation of the first embodiment.

At step S3 processing unit 3 determines whether or not it is necessary to produce assist information as to the lane change by calling a program of assist operation controlling means 3a which is one of the processing blocks of processing unit 3. FIG. 5 shows a flowchart of a processing executed at assist operation controlling means 3a.

At step S31 in FIG. 5 a signal indicative of the manipulation state of turn indicator 5 is checked. When turn indicator 5 is put in off state, the program directly proceeds to step S35 wherein it is determined that no lane change assist is executed, and then the present routine is terminated.

When turn indicator 5 is put in a right turn state, the program proceeds to step S32 wherein information $y_0$ indicative of the lane position of host vehicle 10 is checked. When $y_0>0$ (affirmative determination) at step S32, it is determined that host vehicle 10 travels on the left lane, and the program proceeds to step S34 wherein the assist for the right lane change is executed. Thereafter the present routine is terminated. When $y_0 \leqq 0$ (negative determination) at step S33, the program proceeds to step S35 wherein it is determined that no lane change assist is executed, and the present routine is then terminated.

When turn indicator 5 is put in a left turn state, the program proceeds to step S33 wherein information $y_0$ indicative of the lane position of host vehicle 10 is checked. When $y_0<0$ (affirmative determination) at step S33, it is determined that host vehicle 10 travels on the right lane, and the program proceeds to step S36 wherein the assist for the left lane change is executed. Thereafter the present routine is terminated. When $y_0 \geqq 0$ (negative determination) at step S33, the program proceeds to step S35 wherein it is determined that no lane change assist is executed, and the present routing is then terminated.

When it is determined that no lane change assist is executed at step S3 in FIG. 3, the program jumps to step S7 wherein a control signal indicative that no lane change assist is executed is outputted to display unit 4 to display the information of not executing lane change assist. Thereafter, the present routine of FIG. 3 is terminated.

When it is determined that the lane change assist is executed at step S3, the program in FIG. 3 proceeds to step S4 wherein the processing of prediction interval setting means 3b is executed and therefore a future predicted period for the appropriate speed calculation executed at step S5. The predicted period is set at a time period from the present time t to a future time $t+T(t-t_0)$ which is a time elapsed from the present time t by a time period $T(t-t_0)$, and a function T is defined as follows.

$$T(\tau) = \begin{cases} T_0 - \tau & \cdots & 0 \leq \tau \leq T_0 - T_{min} \\ T_{min} & \cdots & \tau > T_0 - T_{min} \end{cases} \quad (1)$$

where $T_0$ is an initial prediction time period, $T_{min}$ is a lower limit of the prediction time period, and both of them are parameter determined by a designer of this system. Hereinafter, T(t-t0) is basically denoted by T, and the prediction time interval is basically denoted by a set period [t, t+T].

At step S5 the processing of appropriate speed range calculating means 3a is called, and there is executed the calculation of an appropriate speed range which is necessary for host vehicle 10 to change the lane to each gap between other vehicles on the target lane with a predetermined margin. With reference to a flowchart of FIG. 6, there is discussed the processing of appropriate speed range calculating means 3c.

Figure 6:
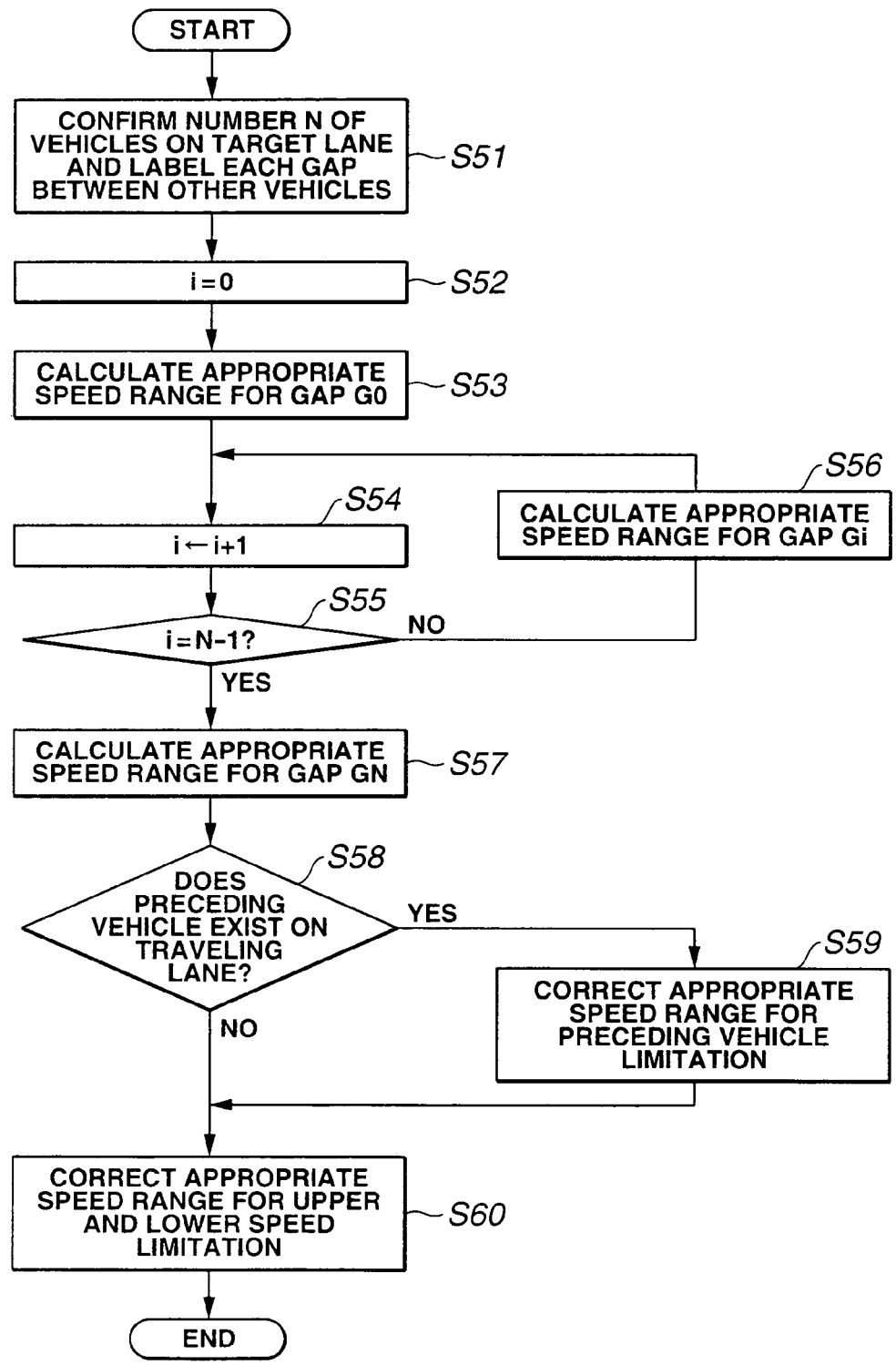
FIG. 6 is a flowchart showing a processing for calculating an appropriate speed range of the first embodiment.
Figure 7:
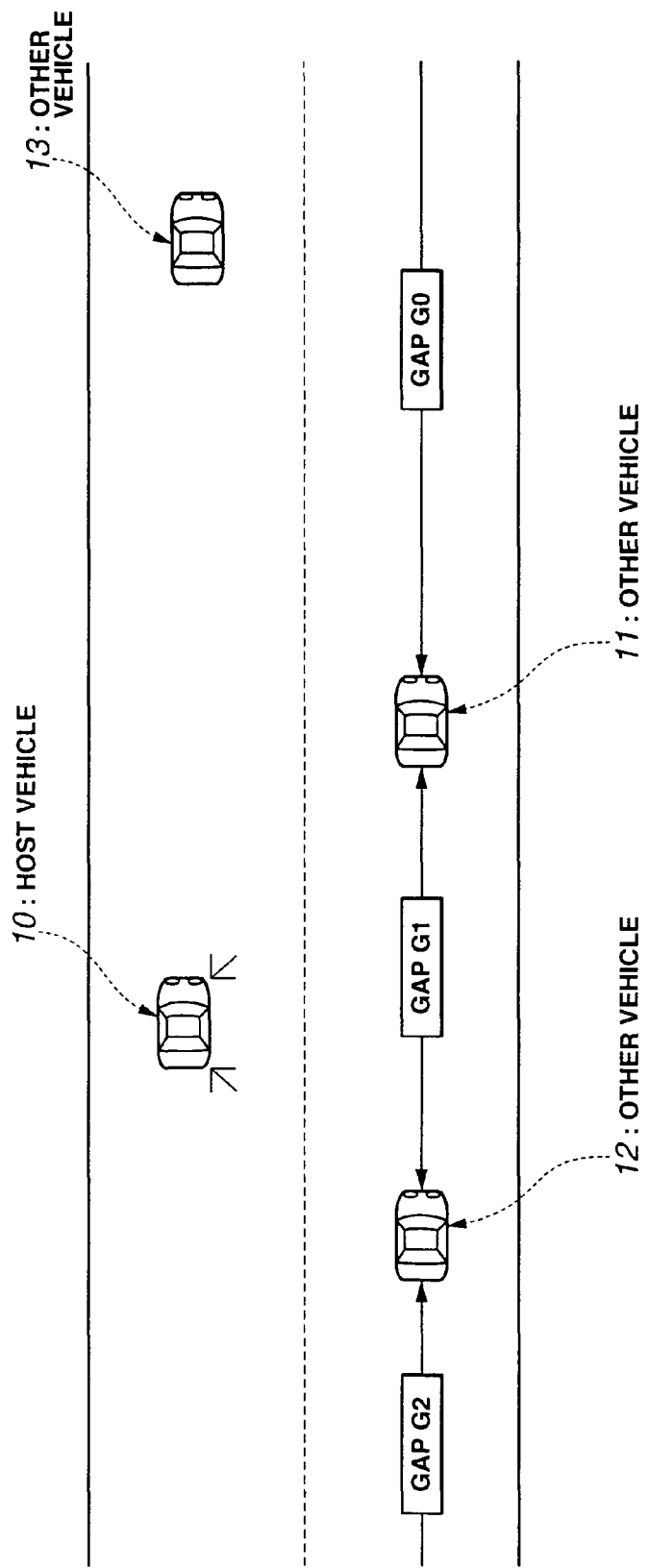
FIG. 7 is a view showing a situation of setting gaps between other vehicles on an adjacent lane.

At step S51 in FIG. 6, processing unit 3 determines a number N of other vehicles traveling on the target lane and labels each gap between other vehicles in the order of 0 to N from the front side of other vehicles. Processing unit 3 determines whether or not the detected other vehicles are traveling on the target lane on the basis of the y-coordinate of each other vehicle. More specifically, under the situation shown in FIG. 4, the determination that other vehicle i (i is an integer specifying other vehicle) is traveling on the target lane (right lane) can be made by checking the condition that $y_i<0$. In case of FIG. 4, since it is determined that other vehicles 11 and 12 are traveling on the target lane, the number N of other vehicle on the target lane is set at 2 (N=2), and therefore gasps G0, G1 and G3 are set as three lane-change candidates as shown in FIG. 7.

At step S52 processing unit 3 initializes the index for sequentially evaluating the gasps at 0.

At step S53 processing unit 3 executes a calculation of an appropriate speed range for gap G0 located at the foremost position of gaps G0, G1 and G2. In order to define the appropriate vehicle speed for the lane change, an appropriate lane change condition as to a positional relationship and a speed relationship between other vehicle 11 and host vehicle 10 is set. An inter-vehicle distance R and a relative speed $\dot{R}$ between other vehicle 11 and host vehicle 10 are defined using the following expressions (2) and (3).

$$R = x_1 - x_0 \quad (2)$$

$$\dot{R} = v_1 - v_0 \quad (3)$$

As a condition of the inter-vehicle distance and the relative speed appropriate for the lane change to gap G0, the following conditions expressed by the following expressions (4) and (5) are employed.

$$R < -h_{min} v_1 \quad (4)$$

$$R < -TTC_{min} \dot{R} \quad (5)$$

Figure 8:
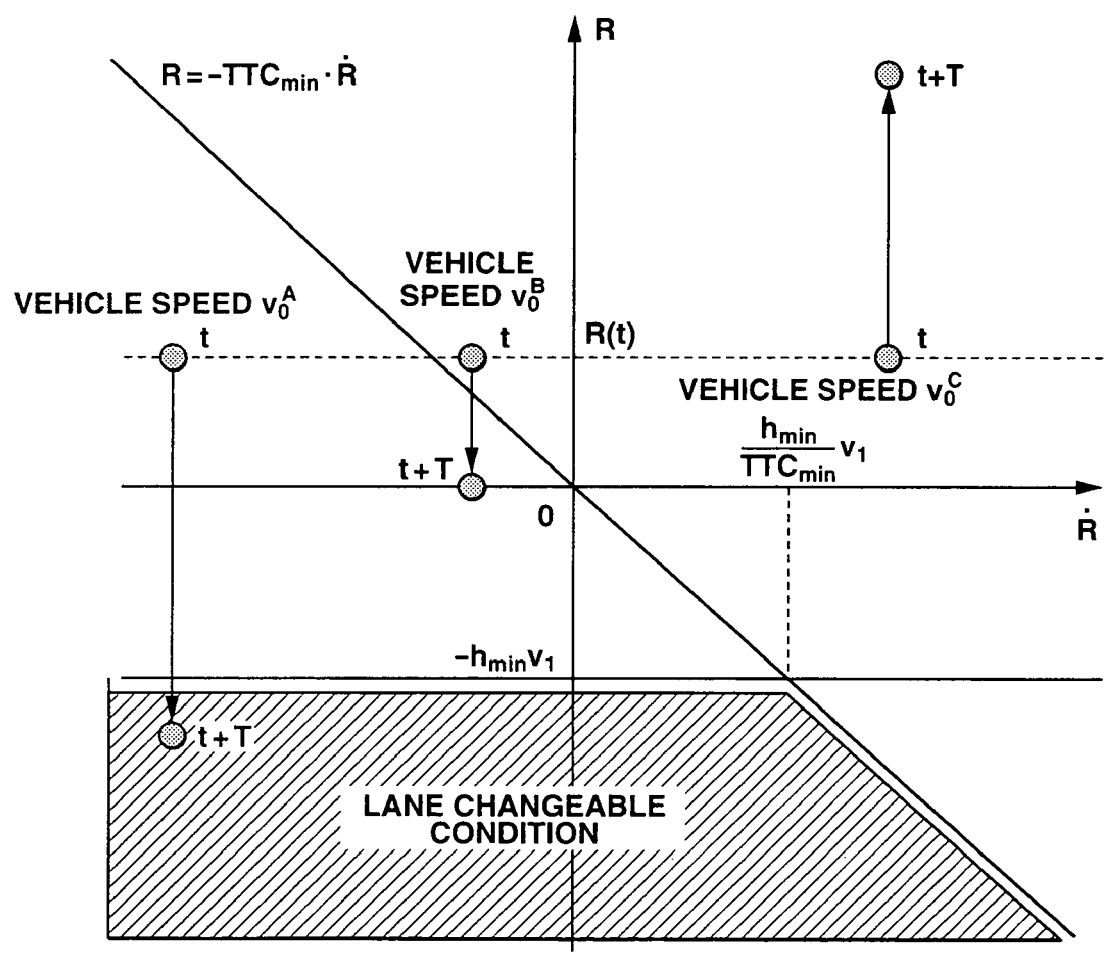
FIG. 8 is a graph showing a lane changeable condition for a gap G0 of FIG. 7 in the first embodiment.

The expression (4) represents a condition requesting that host vehicle 10 travels a position ahead of other vehicle 11 by a headway time $h_{min}$ or more. The expression (5) represents a condition requesting that a collision time (inter-vehicle distance/relative speed) is greater than or equal to $TTC_{min}$ as a margin. Both of $h_{min}$ and $TTC_{min}$ are design parameters designed by the designer of the lane change assist system. FIG. 8 shows the state satisfying the above two conditions.

By assuming that the vehicle speeds of host vehicle 10 and other vehicle 11 are constant within the predicted period, it becomes possible to calculate a change of the state quantity indicative of a relationship between host vehicle 10 and other vehicle 11 on a plane ($\dot{R}$, R). A value $\dot{R}$ represents a time differential of R. FIG. 8 shows loci of points on the plane ($\dot{R}$, R), which represent state quantities as to three speeds that the vehicle speed of host vehicle 10 is set at $v_0^A$, $v_0^B$ and $v_0^C$.

A host vehicle speed by which the state quantity reaches the range indicative of the lane changeable condition within the predicted period is defined as an appropriate speed for gap G0. In case of FIG. 8, host vehicle speed $v_0^A$ is the appropriate speed for gap G0, and host vehicle speeds $v_0^B$ and $v_0^C$ are not the appropriate speed for gap G0. A set of the appropriate speeds is defined as an appropriate speed range.

The concrete value of the appropriate speed range is obtained by the following calculations.

[1] When $R(t) \geqq -h_{min} v_1$, the lane changeable condition at time t+T is $R(t+T) < -h_{min} v_1$. When the host vehicle speed of host vehicle 10 is $v_0^*$, a prediction value $\hat{R}(t+T)$ of R at time t+T is calculated from the following expression (6).

$$\hat{R}(t+T) = R(t) + (v_1 - v_0^*) \cdot T \quad (6)$$

where $\hat{R}$ represents a prediction value of R differential.

From the relationship of $\hat{R}(t+T) < -h_{min} v_1$, the following condition expressed by the expression (7) is obtained.

$$v_0^* > v_1 + \frac{R(t) + h_{min} v_1}{T} \quad (7)$$

[2] When $R(t) < -h_{min} v_1$, the lane changeable condition is satisfied as far as satisfying the condition expressed by the expression (5). Therefore, under this situation, the following condition expressed by the expression (8) is obtained.

$$v_0^* > v_1 + \frac{R(t)}{TTC_{min}} \quad (8)$$

From the above conditions, the appropriate speed range $V_0$ for gap G0 is obtained from the following expression (9).

$$V_0 = \begin{cases} \left\{ v_0^* \mid v_0^* \in \left[ v_1 + \frac{R(t) + h_{min} v_1}{T}, \infty \right] \right\} & \dots R(t) \geq -h_{min} v_1 \\ \left\{ v_0^* \mid v_0^* \in \left[ v_1 + \frac{R(t)}{TTC_{min}}, \infty \right] \right\} & \dots R(t) < -h_{min} v_1 \end{cases} \quad (9)$$

At step S54 the index is incremented by 1. At step S55 it is checked whether or not the index reached N−1. When the index reaches N−1, the program proceeds to step S57. When the index does not reach N−1, the program proceeds to step S56.

At step S56, processing unit 3 calculates the appropriate speed range for executing a lane change to move the gap Gi (i is zero or positive integer) between other vehicles. In the example shown in FIG. 4, gap G1 corresponds to the gap Gi. Hereinafter, there is discussed a concrete calculation method of the appropriate speed range for gap G1 produced between other vehicles 11 and 12. Even when the number N is greater than or equal to 3, by replacing other vehicles 11 and 12 with a forward vehicle and a rearward vehicle between which a gap is produced.

An appropriate lane change condition for gap G1 corresponding to the expressions (4) and (5) is set by the following expressions (12) and (13) based on the expressions (10) and (11).

$$x_1 - x_0 \geq h_{min} v_0 \quad (10)$$

$$x_0 - x_2 \geq h_{min} v_2 \quad (11)$$

$$x_0 - x_1 \leq TTC_{min} \cdot (v_1 - v_0) \text{ and } v_0 \geq v_1 \quad (12)$$

$$x_0 - x_2 \geq -TTC_{min} \cdot (v_0 - v_2) \text{ and } v_0 \leq v_2 \quad (13)$$

In order to simplify the above expressions (10) through (13), a new coordinate system $(\bar{x}, \bar{v})$ is employed. There is assumed an inertia coordinate system which continues a uniform motion at a speed $\{v_1(t)+v_2(t)\}/2$ relative to the ground x-coordinate. More specifically, there is assumed a coordinate system represented by the following transformations (14) through (17).

$$\bar{x}(t - \tau) = x(t + \tau) - (\bar{X} + \bar{V} \cdot \tau) \quad (14)$$

$$\bar{v}(t - \tau) = v(t + \tau) - \bar{V} \quad (15)$$

$$\bar{X} = \frac{x_1(t) + x_2(t)}{2} \quad (16)$$

$$\bar{V} = \frac{v_1(t) + v_2(t)}{2} \quad (17)$$

Figure 9:
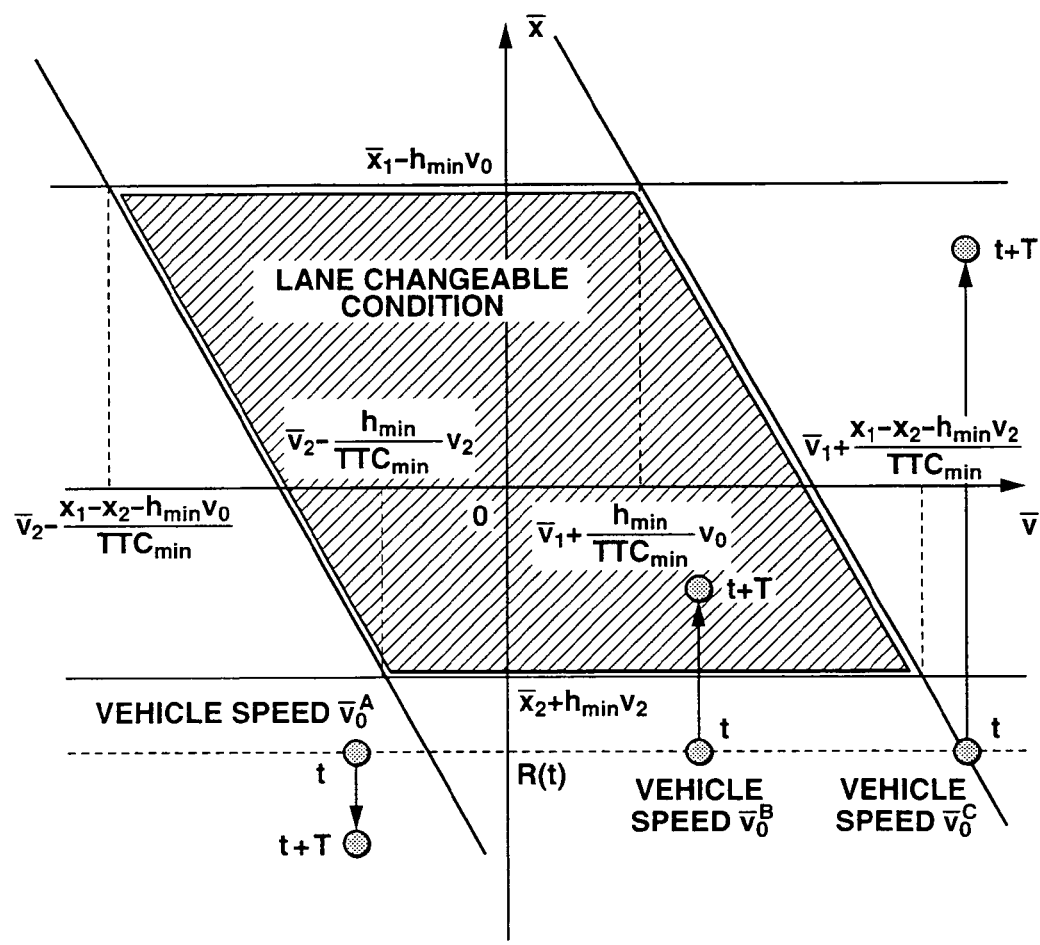
FIG. 9 is a graph showing a lane changeable condition for a gap G1 of FIG. 7 in the first embodiment.

There is shown a phase plane view representing the conditions of the expressions (10) through (14) on the plane $(\bar{x}, \bar{v})$ in FIG. 9.

When a condition defined by the following expression (18) is satisfied, there is no point of simultaneously satisfying the expressions (10) and (11) in the space including gap G1. Therefore, in this condition satisfying the expression (18) it is determined that it is impossible to execute the lane change to gap Gi, and the appropriate speed range thereof is treated as an empty set.

$$x_1 - x_2 < h_{min} \cdot (v_0 + v_2) \quad (18)$$

As is similar to FIG. 8, the loci of the state quantities in the phase plane are determined from the host vehicle speed of host vehicle 10. If the state quantity reaches a parallelogram zone representing a lane changeable condition within the predicted period, it is similarly determined that it is possible to execute the lane change. In the example of FIG. 9, it is determined that the host vehicle speed $\bar{v}_0^B$ is an appropriate speed for the lane change to gap G1, the host vehicle speeds $\bar{v}_0^A$ and $\bar{v}_0^C$ are not the appropriate speed for the lane change to gap G1. More specifically, the concrete value of the appropriate speed range is calculated as follows.

[1] In case that $\bar{x}_0 < \bar{x}_2 + h_{min} v_2$, the lane changeable condition for determining that the lane change can be executed is represented by the following expressions (19) and (20).

$$\hat{\bar{x}}_0(t+T) \geq \hat{\bar{x}}_2(t+T) + h_{min} v_2 \quad (19)$$

$$\bar{v}_0^* \leq \bar{v}_1 + \frac{\bar{x}_1(t) - \bar{x}_2(t) - h_{min} v_2}{TTC_{min}} \quad (20)$$

where the prediction values of the coordinates of host vehicle 10 and other vehicle 12 at time t+T are represented as $$\hat{\bar{x}}_0(t+T) \text{ and } \hat{\bar{x}}_2(t+T),$$

respectively.

Under the condition that host vehicle speed $\bar{v}_0^*$ of host vehicle 10 and vehicle speed $\bar{v}_2$ of other vehicle 12 are constant, the prediction values of the coordinates of host vehicle 10 and other vehicle 12 at time t+T are represented by the following expressions (21) and (22).

$$\hat{\bar{x}}_0(t+T) = \bar{x}_0(t) + \bar{v}_0^* T \quad (21)$$

$$\hat{\bar{x}}_2(t+T) = \bar{x}_2(t) + \bar{v}_2 T \quad (22)$$

Therefore, the lane changeable condition of host vehicle speed $\bar{x}_0^*$ is represented by the following expression (23) from the expressions (19), (20) and (21).

$$\bar{v}_0^* \geq \bar{v}_2 + \frac{\bar{x}_2(t) - \bar{x}_0(t) - h_{min} v_2}{T} \quad (23)$$

By returning the present coordinate to a normal coordinate, a condition equivalent to the expression (23) is expressed by the following expression (24).

$$v_0^* \geq v_2 + \frac{x_2(t) - x_0(t) + h_{min} v_2}{T} \quad (24)$$

Similarly, by returning the present coordinate to the normal coordinate a condition equivalent to the expression (20) is expressed by the following expression (25).

$$v_0^* \leq v_1 + \frac{x_1(t) - x_2(t) - h_{min}v_2}{TTC_{min}} \quad (25)$$

Therefore, the appropriate speed range is represented by the following expression (26).

$$v_2 + \frac{x_2(t) - x_0(t) - h_{min}v_2}{T} \leq v_0^* \leq v_1 + \frac{x_1(t) - x_2(t) - h_{min}v_2}{TTC_{min}} \quad (26)$$

[2] In case that $\bar{x}_0 > \bar{x}_1 - h_{min}v_0$, the lane changeable condition for determining that the lane change can be executed is represented by the following expressions (27) and (28).

$$\hat{\bar{x}}_0(t+T) \leq \hat{\bar{x}}_1(t+T) - h_{min}v_0 \quad (27)$$

$$\bar{v}_0^* \geq \bar{v}_2 - \frac{\bar{x}_1(t) - \bar{x}_2(t) - h_{min}v_0}{TTC_{min}} \quad (28)$$

By obtaining the appropriate speed range of the case [2] in the same manner of the case [1], the appropriate speed range is expressed by the following expression (29).

$$v_2(t) + \frac{x_2(t) - x_1(t) + h_{min}v_2}{TTC_{min} - h_{min}} \leq v_0^* \leq v_1 + \frac{x_1(t) - x_0(t) - h_{min}v_1}{T + h_{min}} \quad (29)$$

[3] In case that $\bar{x}_1 - h_{min}v_0 \leq \bar{x}_0 \leq \bar{x}_2 + h_{min}v_2$, the condition satisfies at least a condition that the target vehicle speed is in the lane changeable condition represented by the parallelogram. Since the conditions (10) and (11) are already satisfied from the assumption, the appropriate speed range is expressed by the following expression (30) obtained by solving the inequalities (12) and (13).

$$v_2 + \frac{x_2 - x_0}{TTC_{min}} \leq v_0^* \leq v_1 - \frac{x_0 - x_1}{TTC_{min}} \quad (30)$$

By sorting the above discussed contents, the following expression (31) is obtained as the appropriate speed range $V_1$ for gap G1.

$$V_1 = \begin{cases} \left\{ v_0^* \mid v_0^* \in \left[ v_2 + \frac{x_2(t) - x_0(t) + h_{min}v_2}{T}v_1 + \frac{x_1(t) - x_2(t) - h_{min}v_2}{T} \right] \right\} & \cdots \quad x_0(t) < x_2(t) + h_{min}v_2 \\ \left\{ v_0^* \mid v_0^* \in \left[ v_2 + \frac{x_2(t) - x_1(t) + h_{min}v_2}{TTC_{min} - h_{min}}v_1 + \frac{x_1(t) - x_0(t) - h_{min}v_1}{T + h_{min}} \right] \right\} & \cdots \quad x_0(t) > x_1(t) - h_{min}v_0 \\ \left\{ v_0^* \mid v_0^* \in \left[ v_2 + \frac{x_2(t) - x_0(t)}{TTC_{min}}v_1 - \frac{x_0(t) + x_1(t)}{TTC_{min}} \right] \right\} & \cdots \quad \text{otherwise} \end{cases} \quad (31)$$

These calculations are repeatedly executed from i=1 to i=N−1 to calculate the appropriate speed range $V_i$ for each gap Gi.

At step S57 an appropriate speed range for gap GN located at a rearmost position is obtained. With reference to FIG. 4, the explanation of this calculation is explained.

An inter-vehicle distance and a relative speed between the host vehicle 10 and other vehicle 12 producing gap GN are defined by the following expressions (32) and (33) as similar to the expression (2) and (3).

$$R = x_2 - x_0 \quad (32)$$

$$\dot{R} = v_2 - v_0 \quad (33)$$

As a condition for the inter-vehicle distance and a relative speed appropriate for the lane change to gap GN, the following two conditions expressed by the following expressions (34) and (35) are employed.

$$R > h_{min}v_0 \quad (34)$$

$$R > -TTC_{min}\dot{R} \quad (35)$$

Figure 10:
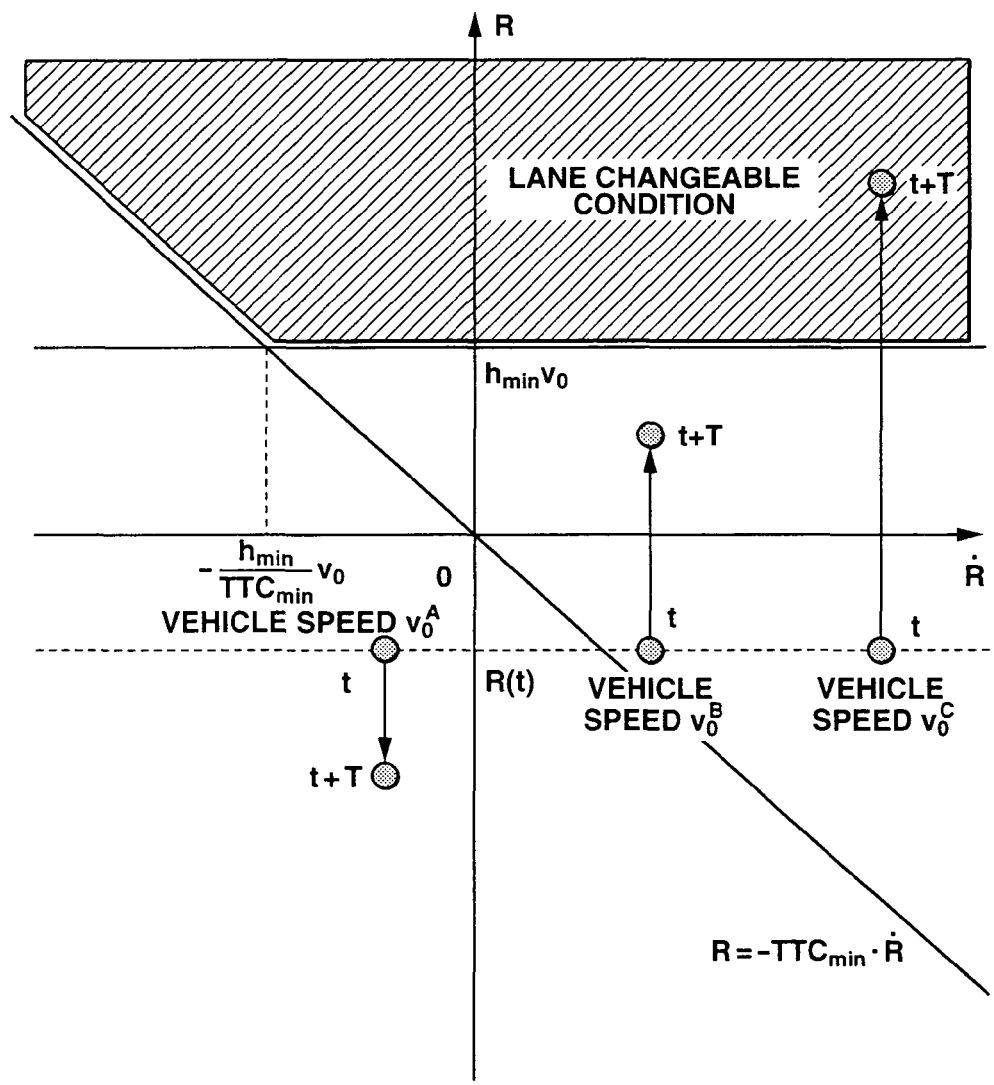
FIG. 10 is a graph showing a lane changeable condition of a gap G2 of FIG. 7 in the first embodiment.

The condition of satisfying the expressions (34) and (35) is represented by FIG. 10. FIG. 10 shows loci of points on the plane ($\dot{R}$, R), which represent state quantities as to three speeds which are the vehicle speed of host vehicle 10 and are set at $v_0^A$, $v_0^B$ and $v_0^C$ respectively.

A host vehicle speed by which the state quantity reaches the range indicative of the lane changeable condition within the predicted period is defined as an appropriate speed for gap G0. In case of FIG. 10, host vehicle speed $v_0^C$ is the appropriate speed for gap G0, and host vehicle speeds $v_0^A$ and $v_0^B$ are not the appropriate speed for gap G0.

The concrete value of the appropriate speed range is obtained by the following calculations.

[1] When $R(t) \geq h_{min}v_0$, the lane changeable condition at time t+T is $R(t+T) > h_{min}v_0$. From the relationship of $\hat{R}(t+T) < -h_{min}v_0$, the following condition expressed by the expression (36) is obtained.

$$v_0^* < v_2 + \frac{R(t) - h_{min}v_2}{T + h_{min}} \quad (36)$$

[2] When $R(t) < h_{min}v_0$, the lane changeable condition is satisfied as far as satisfying the condition expressed by the expression (35). Therefore, under this situation, the following condition expressed by the expression (37) is obtained.

$$v_0^* < v_2 + \frac{R(t)}{TTC_{min}} \quad (37)$$

From the above conditions, the appropriate speed range $v_0$ for gap G0 is obtained from the following expression (38).

$$V_N = \begin{cases} \left\{ v_0^* \mid v_0^* \in \left[ -\infty v_2 + \frac{R(t) - h_{min}v_2}{T} \right] \right\} & \cdots \quad R(t) \geq -h_{min}v_0 \\ \left\{ v_0^* \mid v_0^* \in \left[ -\infty v_2 + \frac{R(t)}{TTC} \right] \right\} & \cdots \quad R(t) < -h_{min}v_0 \end{cases} \quad (38)$$

At step S58, it is checked whether or not a preceding vehicle is traveling ahead on host vehicle 10 on the traveling lane. For example, in case that host vehicle 10 is traveling on the left lane, a condition that $y_i > 0$ and $x_i < x_0$ is set to determine that other vehicle i is a preceding vehicle ahead of host vehicle 10 on the traveling lane. In other vehicles satisfying one of the above two inequalities, other vehicle taking the minimum value of $x_i$ is a preceding vehicle ahead of host vehicle 10 on the traveling lane. In FIG. 4, other vehicle 13 corresponds to the preceding vehicle. When the preceding vehicle is detected, the program proceeds to step S59. When the preceding vehicle is not detected, the program proceeds to step S60.

At step S59, there is executed a correction of eliminating an improper speed range, by which it is difficult to ensure a suitable margin of the inter-vehicle distance by the lane change completion, from the calculated appropriate speed ranges $V_0$ through $V_N$. With reference to FIG. 4, there is explained this correction process.

First, the inter-vehicle distance and the relative speed relative to the preceding vehicle are defined as follows.

$$R = x_3 - x_0 \quad (39)$$

$$\dot{R} = v_3 - v_0 \quad (40)$$

On the assumption that the speed of the preceding vehicle is constant, it is requested that the inter-vehicle distance and the relative speed satisfy the following expressions (33) and (34), respectively.

$$\hat{R}(t+T) > h_{min} v_0^* \quad (41)$$

$$\hat{R}(t+T) > -TTC_{min} \cdot (v_3 - v_0^*) \quad (42)$$

Since $\hat{R}(t+T)$ is calculated in the same manner of the expression (6), the expressions (41) and (42) are expressed by the following expressions (43) and (44).

$$v_0^* \leq v_3 + \frac{R(t) - h_{min} v_3}{h_{min} + T} \quad (43)$$

$$v_0^* \leq v_3 + \frac{R(t)}{TTC_{min} + T} \quad (44)$$

Accordingly, the appropriate speed range having the margin of the inter-vehicle distance relative to the preceding vehicle is set by the following expression (45).

$$V_P = \left\{ v_0^* \;\middle|\; v_0^* \in \left[ -\infty \; v_3 + \min\left( \frac{R(t) - h_{min} v_3}{h_{min} + T}, \frac{R(t)}{TTC_{min} + T} \right) \right] \right\} \quad (45)$$

By setting the intersection $V_0 \cap V_P, \ldots, V_N \cap V_P$ of the appropriate speed ranges $V_0$ through $V_N$ of the respective gaps relative to the appropriate speed range $V_P$ as the new appropriate speed range, the correction of the appropriate speed range is executed.

At step S60, the correspond of the appropriate speed range is executed on the basis of the upper limit and the lower limit of the speed range. More specifically, on the basis of the upper limit $V_{max}$ and the lower limit $V_{min}$ of the target vehicle speed which have been determined with reference to a driving operation characteristic of general drivers, the appropriate speed range $V_L$ based on the upper and lower limits is defined as follows.

$$V_L = \{ v_0^* \mid v_0^* \in [v_{min}, v_{max}] \} \quad (46)$$

By setting the intersection $V_0 \cap V_L, \ldots, V_N \cap V_L$ of the appropriate speed ranges $V_0$ through $V_N$ of the respective gaps relative to the appropriate speed range $V_L$ as the new appropriate speed range, the correction of the appropriate speed range is executed.

Figure 11:
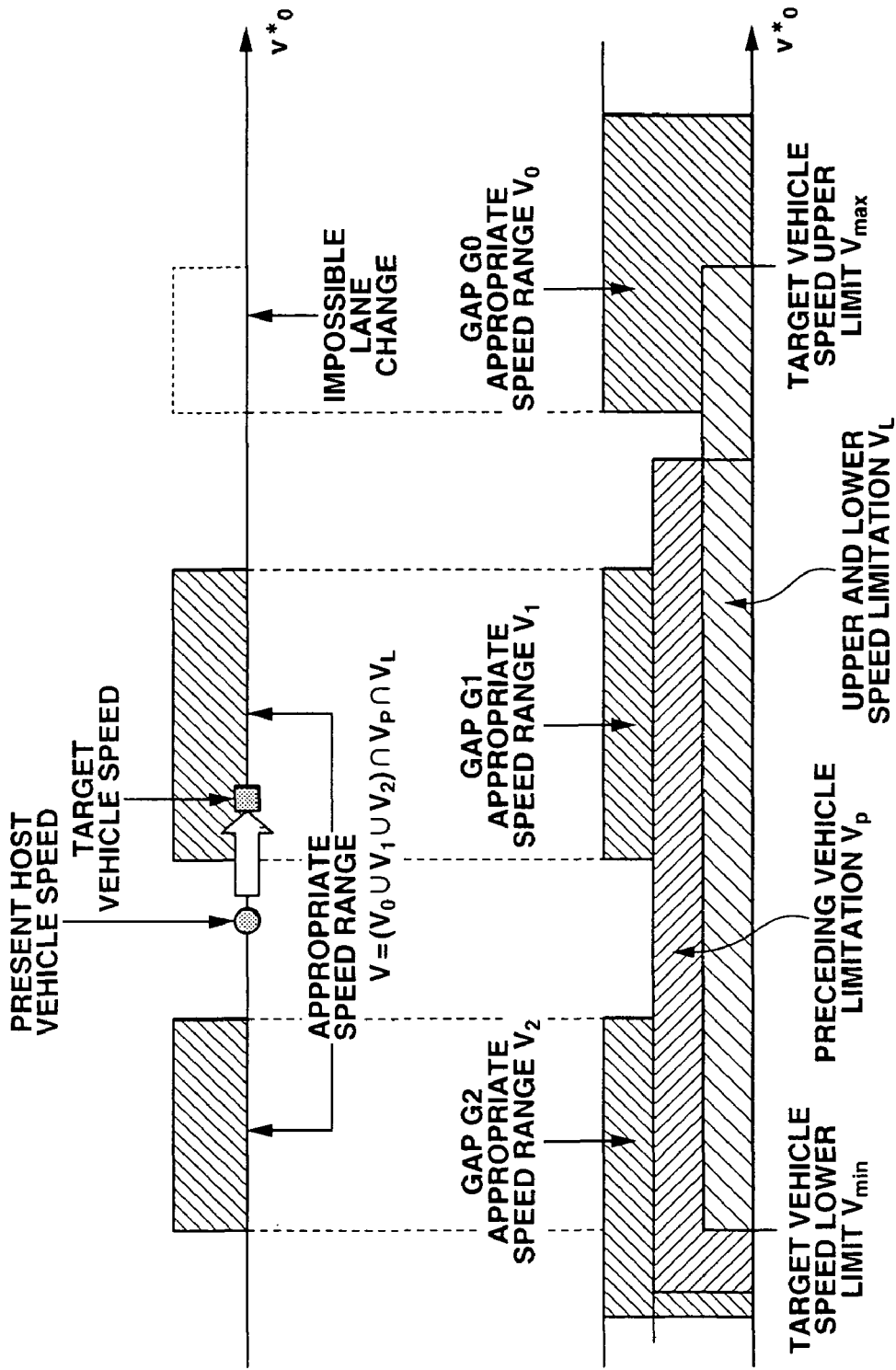
FIG. 11 is a calculation example as to the appropriate speed range and a target vehicle speed in the first embodiment.

At step S6 processing unit 3 obtains the target vehicle speed appropriate for the lane change by comparing the calculated appropriate speed range with the present host vehicle speed. For example, the calculation result as to the appropriate speed range in the case of FIG. 4 is shown in FIG. 11. Since gap G0 does not satisfy the preceding vehicle limitation, it is determined that gap G0 is not put in the lane changeable condition. Gases G1 and G2 include the appropriate speed range. The present host vehicle speed is at the intermediate position between the appropriate speed range for gap G1 and the appropriate speed range for gap G2. It is predicted that it is difficult to execute the lane change during the predicted period with the margin while maintaining the host vehicle speed. Under this condition, the gap whose appropriate speed range includes the nearest factor to the host vehicle speed is selected as the gas to which the host vehicle is moved by the lane change, by comparing the host vehicle speed and the appropriate speed range. Further, the nearest factor to the host vehicle speed is set at the target vehicle speed, or the point offset from the boundary of the appropriate speed range toward the center of the appropriate speed range by a proper margin $\Delta v$ may be set at the target vehicle speed.

When the host vehicle speed is within the appropriate speed range for one of the gaps, the present host vehicle speed is directly set at the target vehicle speed. As a setting method of the target vehicle speed, there may be employed other method except for the setting method of setting the target vehicle speed on the smaller difference between the host vehicle speed and the appropriate speed range. For example, in case that it is intended to change the lane to the forward-most position as possible, the target vehicle speed is set at the maximum speed in the appropriate speed range. Further, when the appropriate speed range becomes an empty set, an appropriate vehicle speed for traveling the present traveling lane and not for executing the lane change is selected from the appropriate speed range $V_P$ determined by the preceding vehicle limitation as a provisional target speed. More specifically, when the present host vehicle speed is in the appropriate speed range $V_P$, the present host vehicle speed is set as the provisional target vehicle speed. When the present host vehicle speed is not in the appropriate speed range $V_P$, the maximum vehicle speed in the appropriate speed range $V_P$ is set as the provisional target vehicle speed. When the appropriate speed range $V_P$ is not defined due to the inexistence of the preceding vehicle ahead of the host vehicle in the traveling lane, the present host vehicle speed is set as the provisional target vehicle speed.

At step S7 a command signal for displaying the target vehicle speed set at step S6 on display unit 4 is generated and sent to display unit 4. When the appropriate speed range is an empty set, a display signal indicative that there is no appropriate speed range for the lane change is generated and sent to display unit 4. When it is determined at step S3 that it is not necessary to execute the lane change assist operation, a signal indicative of the unnecessary state of the lane change assist is generated and sent to display unit 4.

Display unit 4 displays the information as to the lane change assist according to the command signal sent from processing unit 3. FIGS. 12A, 12B and 12C show examples of displayed contents on display unit 4. As understood from FIGS. 12A through 12C, display unit 4 displays the manipulation state of turn indicator 5 and the calculated target speed. Simultaneously an arrow which shows whether the present host vehicle speed is higher or lower than the target vehicle speed so that the driver can understand the relationship between the host vehicle speed and the target vehicle speed without conscious deductive effort. Further, when no lane changeable gap is found, the displayed provisional vehicle speed is flashed and an alarm sound is generated to strongly inform this lane unchangeable state to the driver. When it is not necessary to execute the lane change assist, no information is generated.

The lane change assist system of the first embodiment according to the present invention comprises vehicle speed sensor 2 functioning as the host vehicle state detecting means for detecting the traveling state of host vehicle 10, the surrounding vehicle detecting means 1a, 1b and 1c for detecting other traveling vehicles around host vehicle 10, lane marker detecting sensor 1d functioning as lane detecting means for detecting lanes around host vehicle 10, assist operation controlling means 3a for setting the target lane to which host vehicle 10 is lane changed and for determining the start and the ending of the lane change assist operation, predicted period setting means 3b for setting the predicted period of evaluating the possibility of the lane change on the basis of the prediction, appropriate speed range calculating means 3c for calculating the appropriate speed range appropriate for the lane change of host vehicle 10, and target vehicle speed setting means for setting the target vehicle speed of host vehicle 10.

The lane change assist method discussed in the first embodiment according to the present invention comprises a step for detecting the traveling state of host vehicle 10, a step for detecting surrounding vehicles traveling around host vehicle 10, a step for setting the target lane to which host vehicle 10 executes the lane change and for determining the start and the ending of the lane change assist operation, a step for setting the predicted period of evaluating the possibility of the lane change on the basis of the prediction, a step for calculating the appropriated speed range appropriate for the lane change of host vehicle 10, and a step for setting the target vehicle speed of host vehicle 10.

The first embodiment according to the present invention is arranged to obtain the speed range appropriate for the lane change to each gap generated by other vehicles traveling on the target lane and to calculate the target vehicle speed for host vehicle 10 base on the appropriate speed range. That is, the target vehicle speed is not the vehicle speed of the adjacent vehicle and is determined based on the appropriate speed range appropriate for the lane change. Accordingly even when a difference between the host vehicle speed and the vehicle speed of the vehicle in the target lane is small or zero, an appropriate speed for easy executing the lane change is obtained by intently producing the difference between the host vehicle speed and the vehicle speed of the vehicle in the target lane. Further, even when a plurality of other vehicles are traveling on the target lane, the lane change assist system of the first embodiment according to the present invention calculates the appropriate speed ranges for the respective gaps generated by the plurality of other vehicles in the target lane. Accordingly, even if the driver selects any gap as the target gap of the lane change, the target vehicle speed appropriate for the lane change is obtained according to the traveling states of the other vehicles producing the target gap.

Assist operation controlling means 3a of processing unit 3 is arranged to set the target lane and to determine the start and the ending of the lane change assist operation on the basis of the manipulation of turn indicator 5 by the driver. That is, by controlling the operation of the lane change assist system while interlocking with the manipulation of turn indicator 5 which is a standard device for informing the lane change intent of the driver, the lane change assist system functions to provide the lane change assist information to the driver without requesting a special driver's manipulation.

Appropriate speed range calculating means 3c is arranged to calculate the appropriate speed range for each gap on the basis of the inter vehicle distances and the relative speeds to the preceding vehicle ahead of host vehicle 10 on the traveling lane and to the other vehicles which produce the gaps on the target lane. Since the appropriate speed range is obtained taking account of the preceding vehicle ahead of host vehicle 10 on the traveling lane in addition to the other vehicles producing the gaps on the target lane, the speed range requiring the excessive approach to the preceding vehicle for the lane change to the target gap is eliminated from the appropriate speed range. This arrangement provides a further realizable appropriate speed range.

Appropriate speed range calculating means 3c is further arranged to calculate the appropriate speed range within a range between the upper limit and the lower limit which have been previously set. This limitation of the appropriate speed range prevents an improper lane change assist that the target vehicle speed is set at an improper high vehicle speed refused by the driver's sense or at an extremely low vehicle speed which prevents the smooth driving.

Target vehicle speed setting means 3d is arranged to set the target vehicle speed by employing a condition that a difference of the speed in the appropriate speed range relative to the host vehicle speed is small, as one of the target vehicle speed selecting condition. With this arrangement, the target vehicle speed is selected from the appropriate speed range with reference to the present vehicle speed of host vehicle 10. Therefore, this arrangement sets the target vehicle speed without requesting the radical acceleration or radical deceleration as possible.

Display unit 4 for displaying the speed guidance for the driver is arranged to display the target vehicle speed calculated at target speed setting means 3d. The lane change assist system is thus arranged to display an example of the target vehicle speed appropriate for the lane change so as to assist the driver's diagnosis as to the lane change.

Further, the lane change assist system comprises alarm means for generating an alarm for the driver so as to inform the inappropriate state of the lane change to the driver when target vehicle speed setting means 3d determines that the appropriate speed range is an empty set. This arrangement also assists the driver's state diagnosis for the lane change positively.

Second Embodiment

Referring to FIGS. 13 through 16, there is discussed a second embodiment of the lane change assist system according to the present invention.

Figure 13:
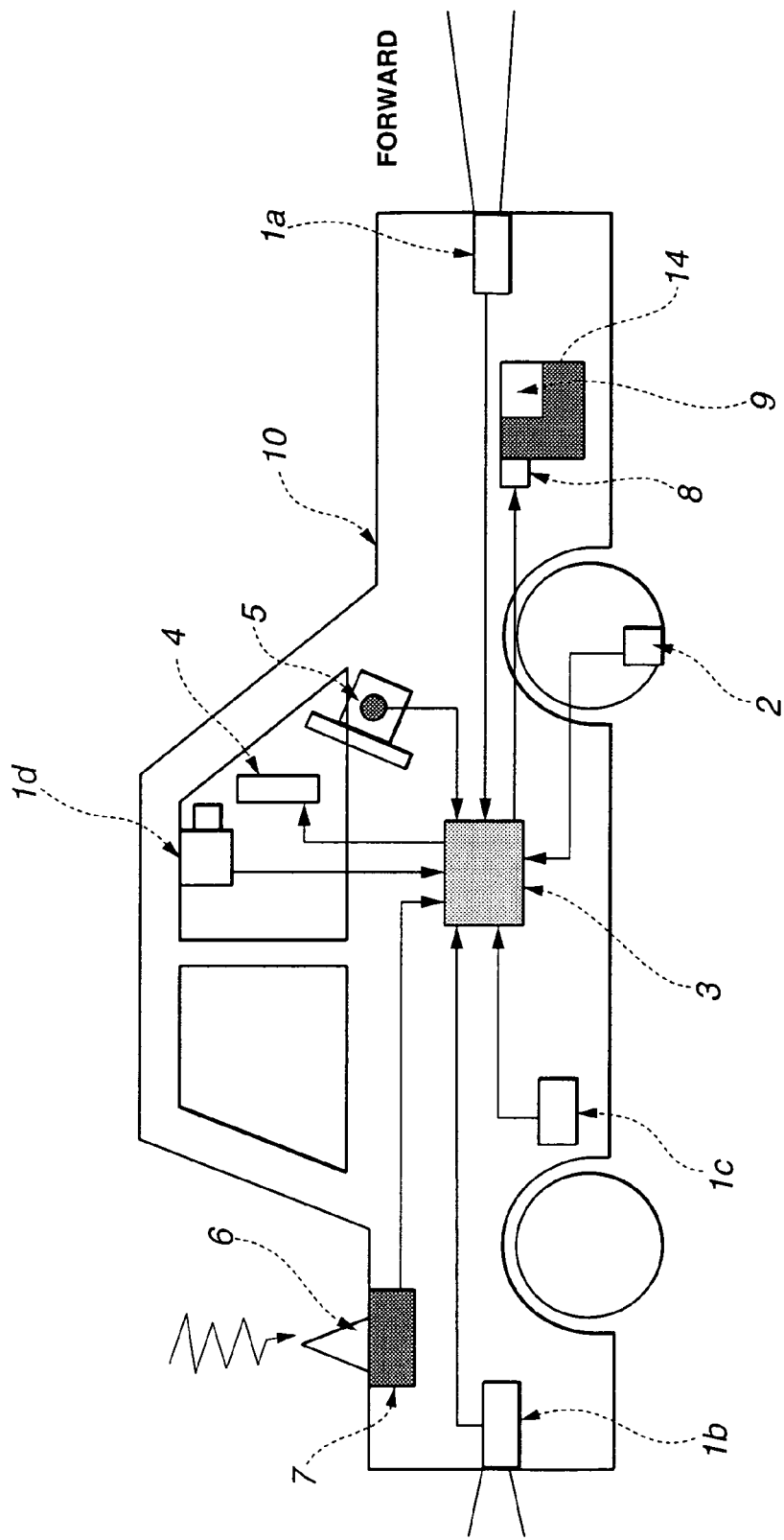
FIG. 13 is a schematic view showing a vehicle equipped with the lane change assist system of a second embodiment according to the present invention.

FIG. 13 is a schematic view of the lane change assist system which host vehicle 10 is equipped with. The lane change assist system of the second embodiment comprises a forward radar 1a, a rearward radar 1b, a sideward sensor 1c, a lane marker (white line) sensor 1d, a vehicle speed sensor 2, a processing unit 3, a display unit 4, a turn indicator 5, a GPS (Global Positioning System) signal receiver 6, map information database 7, a throttle controller 8, a throttle actuator 9 and an engine 14.

The lane change assist system of the second embodiment specially comprises GPS signal receiver 6, map information database 7, throttle controller 8, throttle actuator 9 and engine 14 in addition to the arrangement of the first embodiment.

GPS signal receiver 6 receives a GPS signal and calculates a present position of host vehicle 10 based on the GPS signal. GPS signal receiver 6 identifies a present traveling road of host vehicle 10 by verifying the present position based on the GPS signal and the information stored in map information database 7. Further, when it is determined that the traveling lane is decreased ahead of host vehicle 10 from the information as to the number of lane of the traveling road, which is read from the map information database 7, GPS signal receiver 6 sends the information as to the point of the lane decreased point and the decreased lane to processing unit 3.

Throttle controller 8 executes a vehicle speed control for bringing the host vehicle speed close to the target vehicle speed by controlling the output of engine 14 through the control of the throttle opening using throttle actuator 9 on the basis of the target vehicle speed commanded by processing unit 3 and the present host vehicle speed.

Figure 14:
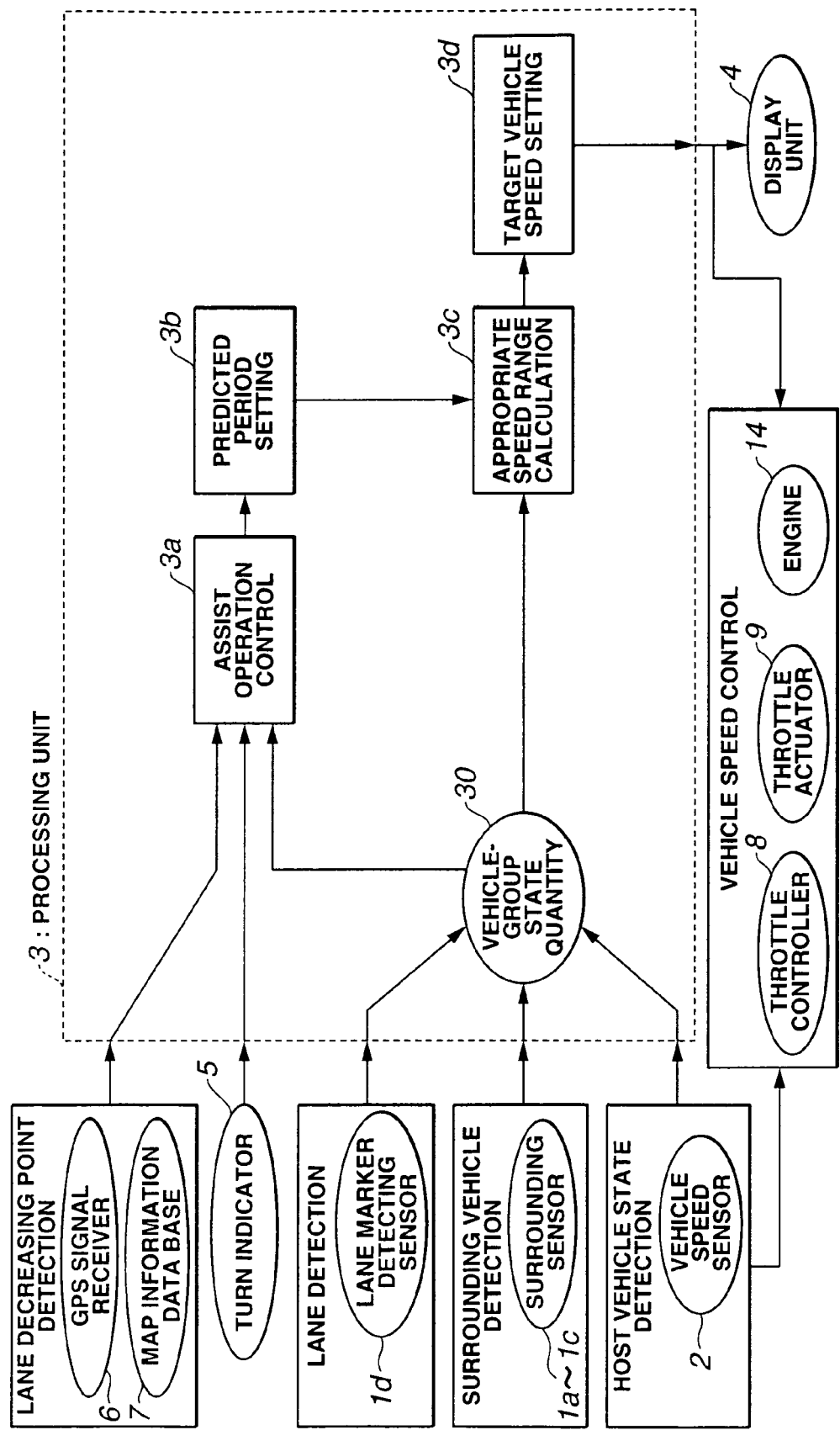
FIG. 14 is a block diagram showing a functional construction of the lane change assist system of the second embodiment.

By the addition of the above discussed devices, processing unit 3 of the second embodiment is constructed as shown in FIG. 14.

Basic construction and processing procedure executed by processing unit 3 are basically the same as those of the first embodiment, except that processing unit 3 newly comprises a lane decreased point detecting means constructed by GPS signal receiver 6 and map information database and a vehicle speed control means constructed by throttle controller 8, throttle actuator 9 and engine 14.

Figure 12:
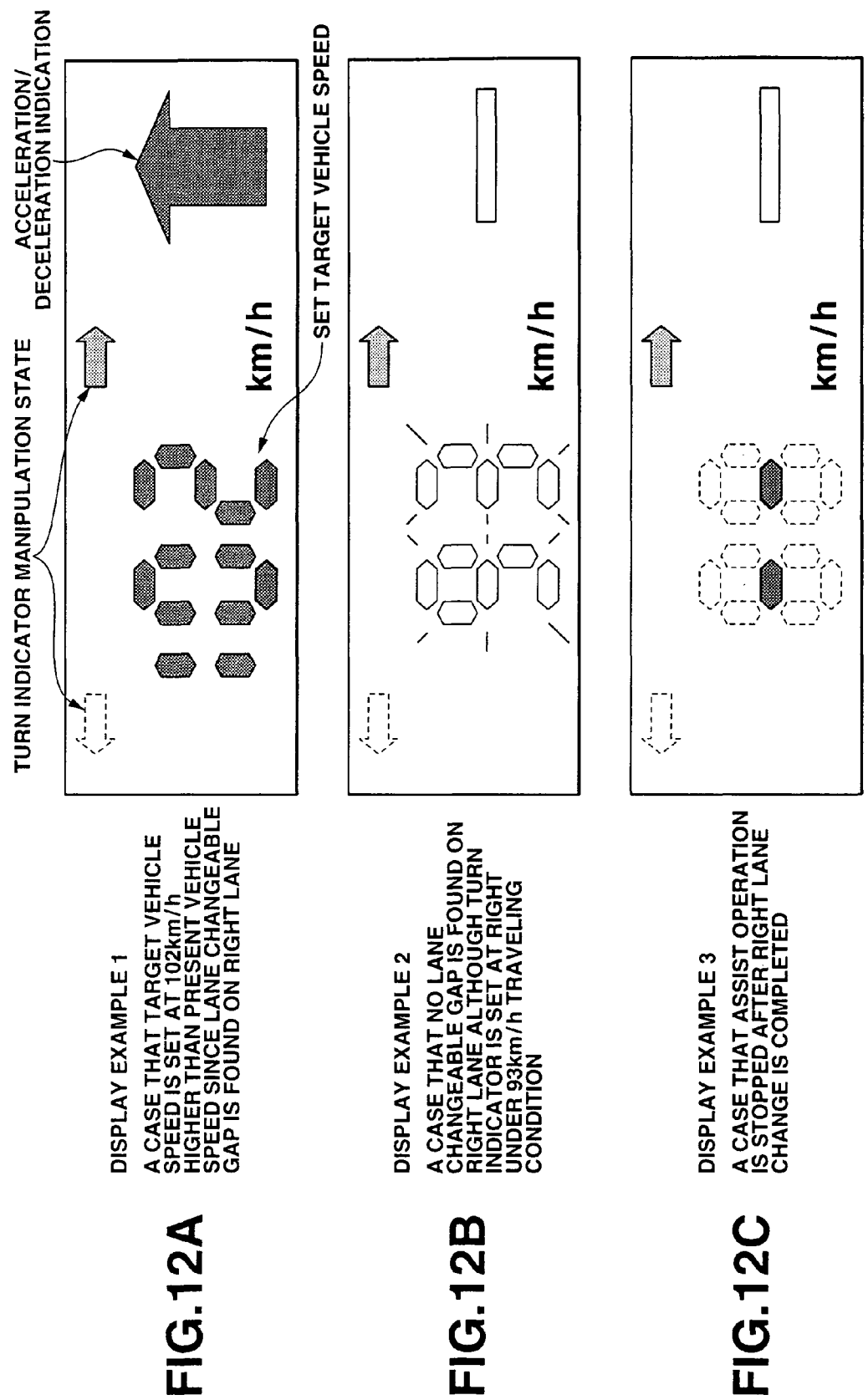
FIGS. 12A, 12B and 12C are display examples displayed by a display unit of the first embodiment.

As shown in FIG. 12, the functions constructed by software in processing unit 3 are basically divided into four blocks and are basically executed as shown by the flowchart in FIG. 3. The contents of each block and each step are slightly changed, and therefore the changed parts are explained hereinafter.

Figure 15:
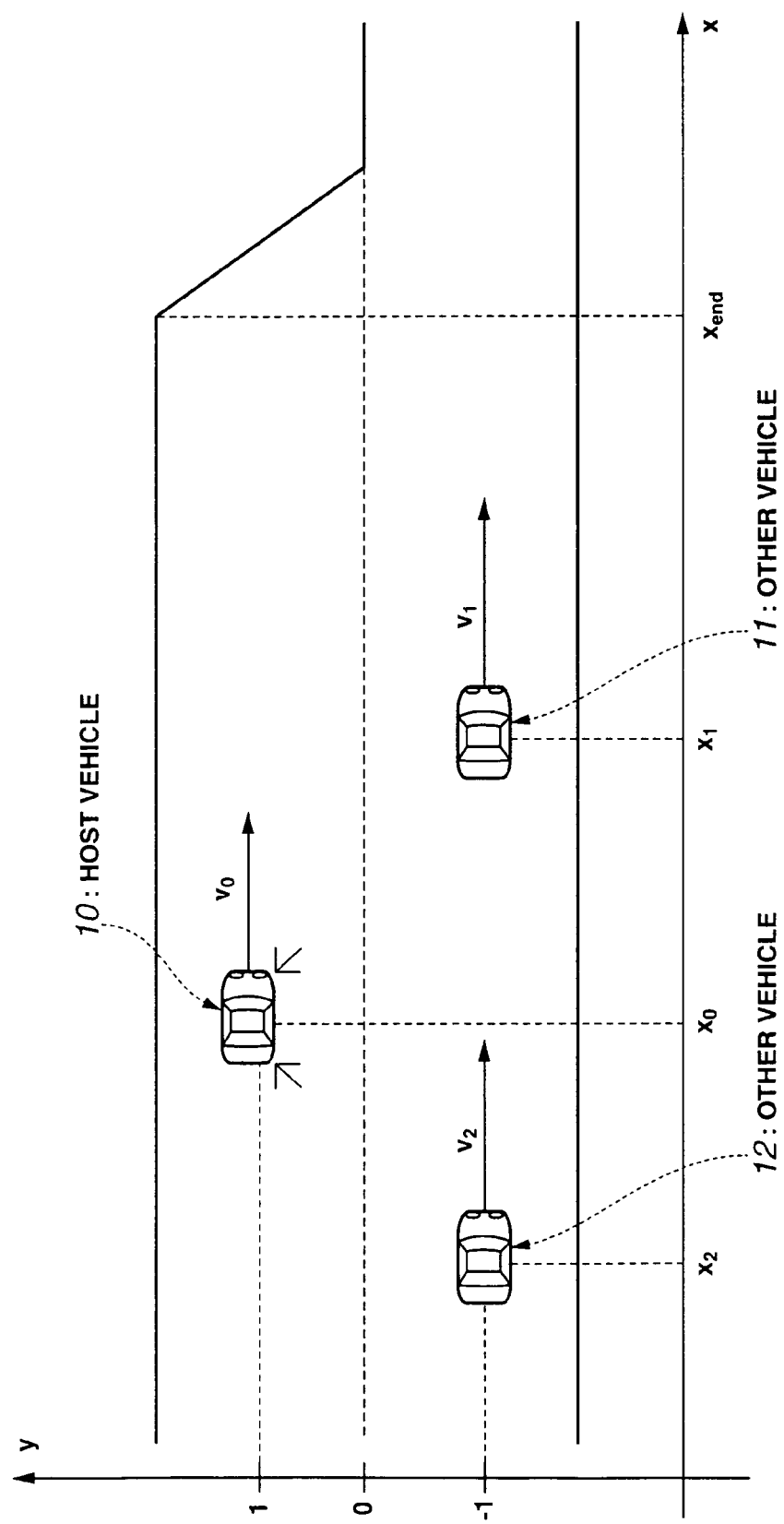
FIG. 15 is a view showing a situation in which the host vehicle equipped with the lane change assist system of the second embodiment is encountered.

At step S1 in FIG. 3, the processing unit 3 receives GPS signal from GPS signal receiver 6 and execute the map matching with map information database 7, in addition to receiving the signals of surrounding sensors 1a through 1c and vehicle speed sensor 2. In case that the number of lanes of the traveling road is soon decreased as shown in FIG. 15, processing unit 3 calculates the information of the x-coordinate $x_{end}$ (traveling-direction coordinate) at the lane decreased point and the direction of the decreased lane toward the left lane or right lane. The x-coordinate $x_{end}$ of the lane decreased point is set at a point nearer than the actual lane decreased point relative to host vehicle 10 so as to execute the lane change with a margin.

The processing at step S2 of the second embodiment is equal to that of the first embodiment.

Figure 16:
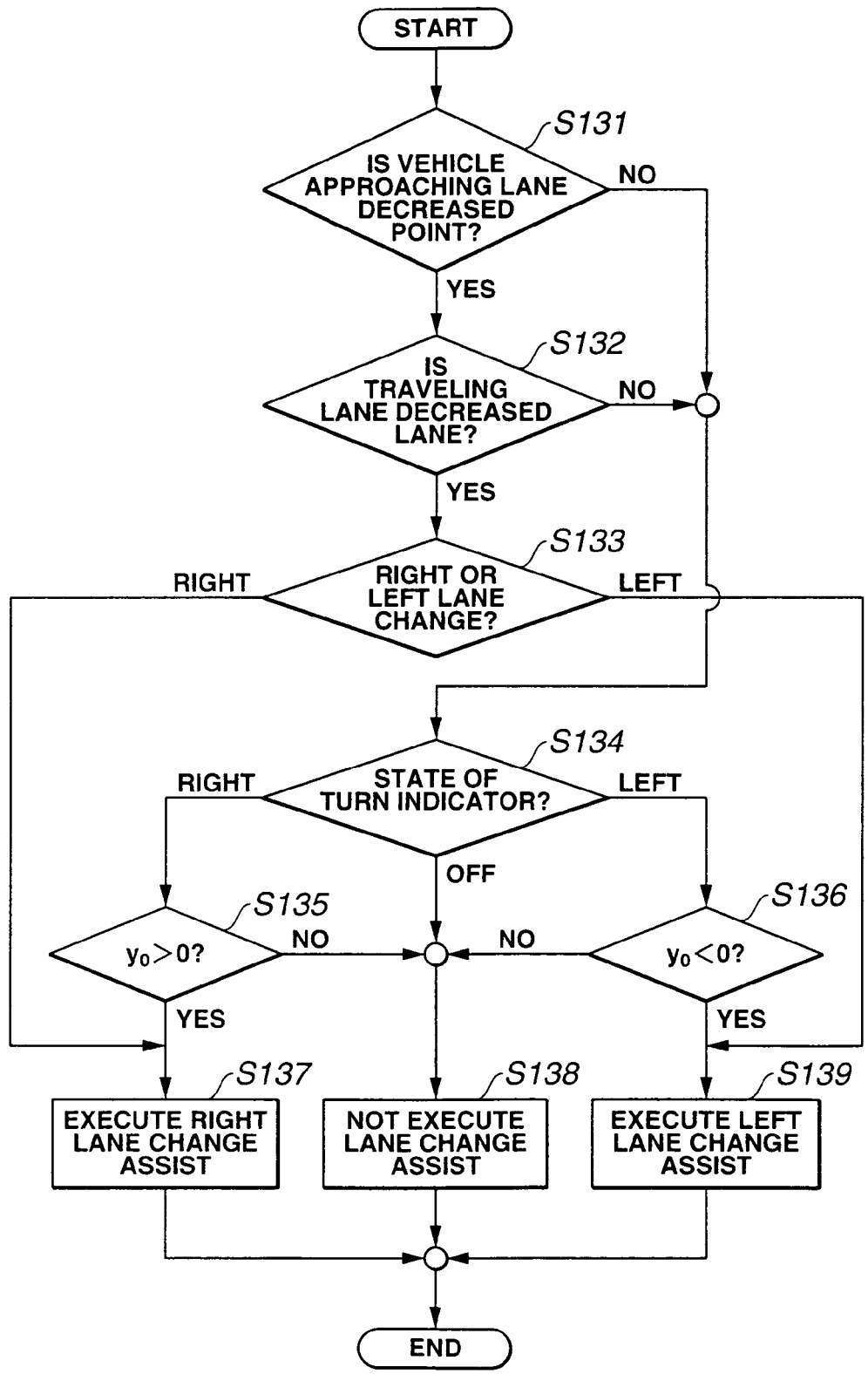
FIG. 16 is a flowchart showing a processing for controlling an assist operation of the second embodiment.

At step S3, processing unit 3 executes a subroutine shown by a flowchart of FIG. 16.

In the second embodiment, processing unit 3 determines with reference to the information as to the lane decreased point whether or not it is necessary to execute the lane change assist before checking the manipulation of turn indicator 6.

At step S131 in FIG. 16, it is determined whether or not host vehicle 10 is approaching the lane decreased point. More specifically, using the following expression (47), the determination as to the approach to the lane decreased point is executed.

$$x_{end} - x_0 \geq R_{MLC} \tag{47}$$

where $R_{MLC}$ is a determination threshold.

When the determination at step S131 is affirmative, that is, when the expression (47) is satisfied, the program proceeds to step S132. When the expression (47) is not satisfied, the program proceeds to step S134.

At step S132 it is determined whether or not the traveling lane corresponds to the decreased lane. When determination at step S132 is negative, host vehicle 10 may keep the traveling lane without executing the lane change, and the program proceeds to step S134. When the determination at step S132 is affirmative, that is, when the traveling lane corresponds to the decreased lane, it is necessary to execute the lane change and therefore the program proceeds to step S133.

At step S133 it is determined whether host vehicle 10 has to turn to the right or left on the basis of the information obtained at step S1. When host vehicle 10 has to change the traveling lane to the right lane, the program jumps to step S137. When host vehicle 10 has to change the traveling lane to the left lane, the program jumps to step S139. The processing contents of steps S134 through S139 are completely the same as those of steps S31 through S36 shown in FIG. 5, respectively. Therefore the explanation thereof is omitted herein.

At step S4 the predicted period is set. In the first embodiment, host vehicle 10 is put in the situation that it is possible to continue the traveling of the present traveling lane if the condition for the lane change is not suitable as shown in FIG. 4. Therefore, it is possible to extend the execution of the lane change by setting the lower limit of the predicted period. However, in the second embodiment, the lane change assist system is arranged to adapt to the case shown in FIG. 15. In case of FIG. 15 it is necessary to certainly complete the lane change before host vehicle 10 reaches the lane decreased point. Therefore, it is improper to set the lower limit of the predicted period. Therefore, processing unit 3 of the second embodiment sets the predicted period using the following expression (48) in the processing at step S4. That is, the predicted period is set at a time period taken by reaching the lane decreased point under the constant vehicle speed of keeping the present host vehicle speed.

$$T(t) = \frac{x_{end} - x_0(t)}{v_0(t)} \tag{48}$$

The calculation procedure of the appropriate speed range executed at step S5 of the second embodiment is completely the same as that of the first embodiment.

The calculation procedure of the target speed executed at step S6 is basically the same as that of the first embodiment. However, there is no choice of the provisional target vehicle speed which is set when the appropriate speed range is an empty set and host vehicle 10 suspends the lane change, at the point before the lane decreased point shown in FIG. 15. Therefore, when the appropriate speed range for the lane change is not found, the target vehicle speed is set at a vehicle speed by which host vehicle 10 stops at the lane decreased point upon taking account of a bad case that host vehicle 10 cannot execute the lane change before host vehicle 10 reaches the meeting point of the traveling lane and the adjacent lane. When the maximum deceleration realized by the vehicle speed controlling means is $d_{max}$, the maximum value $v_0^{max}$ of the vehicle speed by which host vehicle 10 can stop at the lane decreased point is represented by the following expression (49).

$$v_0^{max} = \sqrt{2 \cdot d_{max} \cdot (x_{end} - x_0)} \tag{49}$$

Therefore, the target vehicle speed $v_0^*$ is represented by the following expression (50).

$$v_0^* = \max(v_0^{max}, v_0) \tag{50}$$

At step S7, processing unit 3 outputs the command signal to the vehicle speed controlling means in addition to the output signal to display unit 4.

Processing unit 3 outputs a signal indicative of the target vehicle speed to throttle controller 8 of the vehicle speed controlling means. Throttle controller 8 also receives a signal indicative of the host vehicle speed detected by vehicle speed sensor 2. Throttle controller 8 controls the output of engine 14 by controlling the throttle opening using the throttle actuator 9 so as to correspond a transfer characteristic $G_v(s)$ of the host vehicle speed $v_0$ relative to target vehicle speed $v_0^*$ for the vehicle speed control system with a first-order delay system represented by the following expression (51).

$$G_V(s) = \frac{1}{T_V s + 1} \qquad (51)$$

where $T_V$ is a time constant of the vehicle speed control system.

Display unit 4 of the second embodiment displays the information similar to that displayed by display unit 4 of the first embodiment.

With the thus arranged second embodiment according to the present invention, the lane change assist system is arranged to detect the lane decreased point ahead of host vehicle 10, at which the number of the lanes is decreased. The lane change assist system comprises GPS signal receiver 6 and map information database 7 which function as lane decreased point detecting means for informing the distance to the lane decreased point and the decreased lane. The assist operation controlling means 3a of processing unit 3 is arranged to start the lane change assist operation after the adjacent lane is automatically set as the target lane when the distance between host vehicle 10 and the lane decreased point is smaller than the predetermined distance and host vehicle 10 is traveling on the decreased lane, that is, when host vehicle 10 is put in a forcible lane change condition. Further the assist operation controlling means is arranged to terminate the lane change assist operation when it is determined that the lane change to the target lane is completed. By detecting the situation that host vehicle 10 has to execute the lane change in near future and by automatically starting the lane change assist, the lane change assist system attracts the attention of the driver so that the driver executes the necessary assist operation against the forcible lane change condition.

Further the lane change assist system of the second embodiment comprises throttle controller 8, throttle actuator 9 and engine 14 which are the vehicle speed controlling means for controlling the host vehicle speed of host vehicle 10 at the target vehicle speed. The vehicle speed controlling means is arranged to control the traveling of host vehicle 10 by inputting the target vehicle speed calculated at the target vehicle speed calculating means 3d as the target value of the vehicle speed control system. Since the vehicle speed control system automatically controls the host vehicle speed at the target vehicle speed, it becomes possible to decrease the driver's load of controlling the vehicle speed during the lane change. Further, the predicted period setting means 3d is arranged to set a time when a target time period elapsed from the start of the lane change assist is set as an ending time of the predicted period and to extend the ending time according to the time elapse when the forcible lane change condition is not satisfied. That is, when host vehicle 10 is put in the situation of allowing host vehicle 10 to continue the traveling on the present traveling lane while the driver desires the lane change, the lane change assist system suppresses the generation of the target vehicle speed which requests the driver to complete the lane change within the short time period, by extending the ending time of the predicted period.

Further, the predicted period setting means 3b is arranged to set the ending time of the predicted period at an estimated reaching time when host vehicle 10 will reach a point ahead of the lane decreased point by a predetermined distance when the forcible lane change condition is satisfied. By setting the ending time of the predicted period at a time near the time when host vehicle 10 reaches the lane decreased point, it becomes possible to set the target vehicle speed of completing the lane change before host vehicle reaches the lane decreased point with the highest priority.

With the thus arranged lane change assist system of the second embodiment according to the present invention, the speed control appropriated for the lane change is automatically executed in the situation that the lane change has to be executed. This arrangement largely assists the lane change operation of the driver.

Target speed setting means 3d is arranged to set the appropriate speed range at a speed range of avoiding an excessive approach to a preceding vehicle ahead of host vehicle 10 on the present traveling lane and to select a proper target vehicle speed from the appropriate speed range when the appropriate speed range is an empty set and the forcible lane change condition is not satisfied. The target vehicle speed is selected from vehicle speed appropriate to continue the traveling of the present traveling lane under the situation that no appropriate gas for the lane change is found in the target lane. Accordingly, it becomes possible to execute the assist during a waiting period for finding the appropriate gap for the lane change.

Target speed setting means 3d is arranged to set the target vehicle speed at the vehicle speed enabling host vehicle 10 to stop at a point before the lane decreased point by a deceleration smaller than the predetermined deceleration when the appropriate speed range is an empty set indicative that no gap for the lane change is found and the forcible lane change condition is satisfied. Under this situation that no gap appropriate for the lane change is found at the point nearer to host vehicle 10 than the point at which the lane change has to be executed, the target vehicle speed is set at the vehicle speed of enabling host vehicle 10 to stop before reaching the lane decreased point with a margin. Accordingly, it becomes possible that the lane change assist system requests the driver to execute the stop of host vehicle 10 for awaiting the chance of the lane change without executing the inappropriate lane change in the vicinity of the lane decreased point.

Third Embodiment

Figure 17:
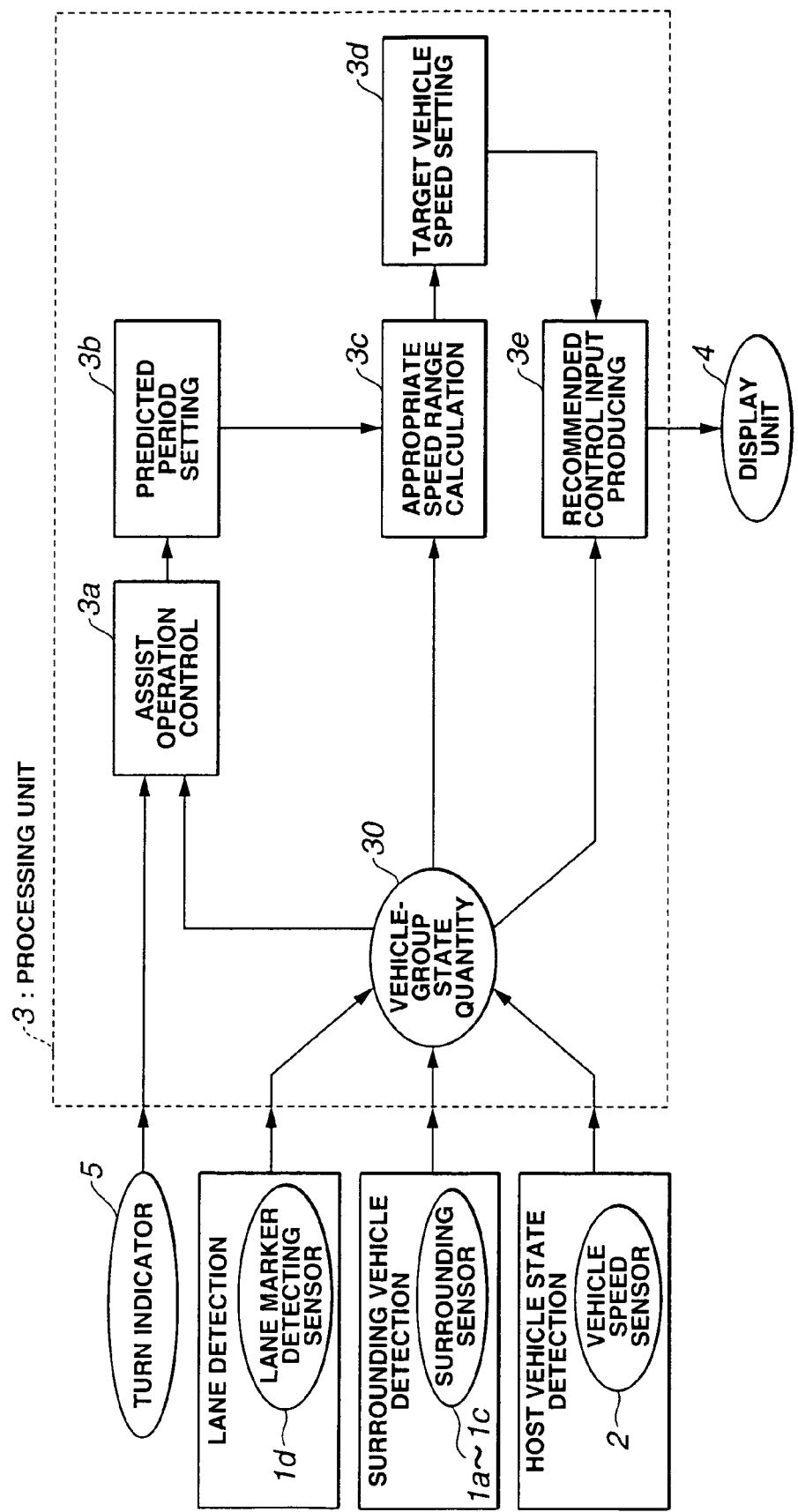
FIG. 17 is a block diagram showing a functional construction of the lane change assist system of a third embodiment.
Figure 18:
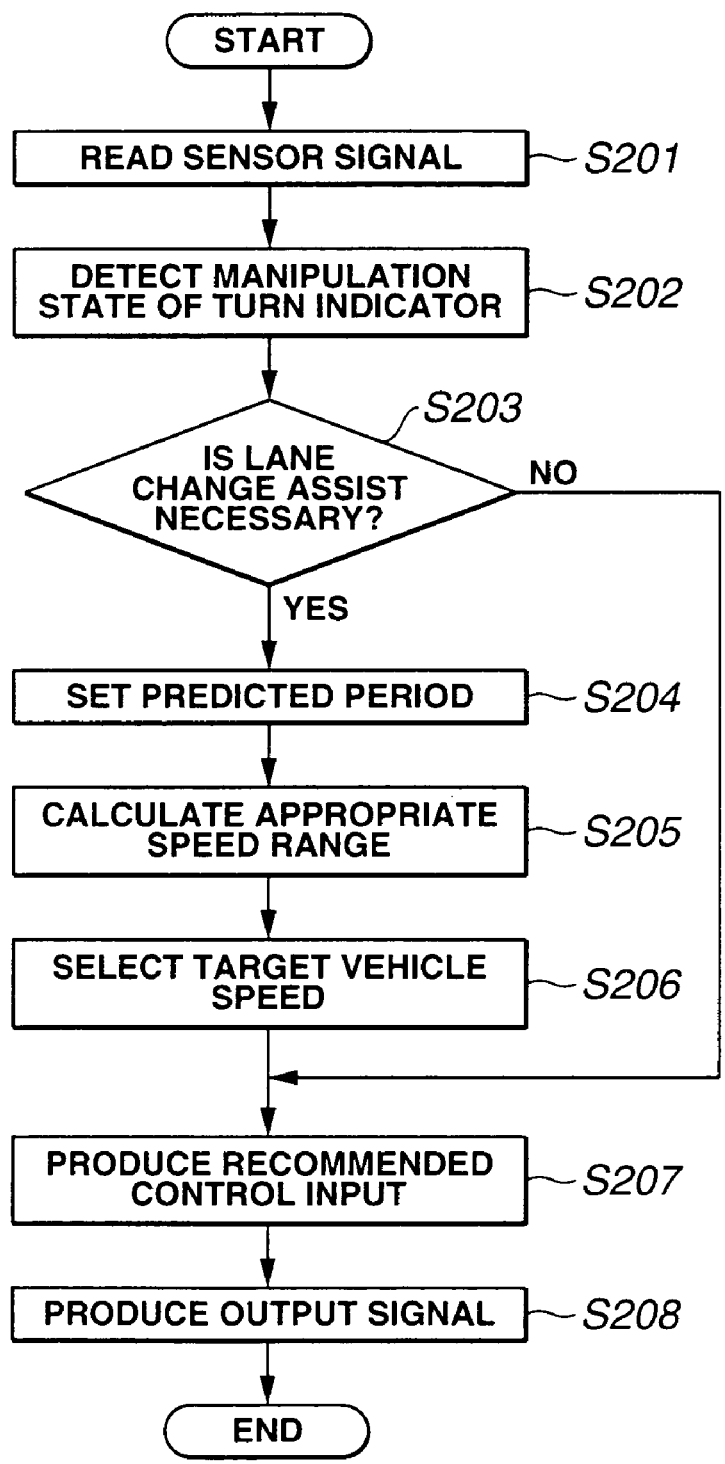
FIG. 18 is a flowchart showing a processing executed by the processing unit of the third embodiment.

Referring to FIGS. 17 through 19, there is discussed a third embodiment of the lane change assist system according to the present invention. The construction of the system of the third embodiment is the same as that of the first embodiment.

FIG. 17 shows a functional block diagram. As shown in FIG. 17, processing unit 3 of the third embodiment further comprises recommended control input producing means (recommend manipulation quantity calculating means) 3e in the form of software. Further, the processing procedure of processing unit 3 of the third embodiment is shown by a flowchart of FIG. 18 wherein a processing of producing a recommended control input (recommended manipulation quantity) is added to as step S207. The processing contents of steps S201 through S206 are completely the same as those of steps S1 through S6, respectively. Therefore the explanation thereof is omitted herein.

At step S207 in the flowchart of FIG. 18, the processing of producing the recommended control input is executed by executing a calculation method constructed by the following expressions (E1) and (E2), which are disclosed in Japanese Published Patent Application No. 2003-228800. This calculation is executed on the setting discussed hereinafter.

$$\dot{x} = f(x, u_x, q) \quad (E1)$$
where $x = (x_A\ v_A\ x_B\ v_B\ x_C\ v_C)^T$,
$f(x, u_x, 1) = (x_A\ u_x\ v_B\ 0\ v_C\ 0)^T$,
$f(x, u_x, 2) =$
$(v_A\ u_x\ v_B\ 0\ v_C\ k_1(x_c - x_B - hv_c) + k_2(v_C - v_B))^T$, and
$f(x, u_x, 3) = (v_A\ u_x\ v_B\ 0\ v_C\ k_1(x_c - x_A - hv_c) + k_2(v_C - v_A))^T$.

$$u_x^*(t; t) = -\frac{1}{r}\lambda_2^*(t) \quad (E2)$$

First, a prediction expression for predicting behaviors of host vehicle 10 and surrounding vehicles and an evaluation function for mathematically evaluating the control input of host vehicle 10 are defined. In case of the third embodiment of the lane change assist system, the prediction expression for predicting the behavior of the surrounding vehicle is derived by the following manner.

As a longitudinal motion model of host vehicle 10, a model expressed by the following expressions (52) and (53) is employed.

$$\dot{x}_0 = v_0 \quad (52)$$

$$\dot{v}_0 = u_x \quad (53)$$

where $u_x$ is an acceleration/deceleration command value of host vehicle 10.

As a lateral motion mode of host vehicle 10, a mode expressed by the following expression (54) is employed.

$$T_{LC}\dot{y}_0 = -y_0 + u_y \quad (54)$$

A behavior model of other vehicle i is set by the following expressions (55) (56) and (57).

$$\dot{x}_i(t) = v_i(t) \quad (55)$$

$$\dot{v}_i(t) = -\omega_i v_i(t) + \omega_i v_i^{com}(t) \quad (56)$$

$$\dot{y}_i(t) = 0 \quad (57)$$

where the following conditions (58) is required.

$$v_i^{com}(t) = \begin{cases} \hat{v}_i^* & \cdots \text{non-following traveling} \\ v_i^f(x_p(t) - x_i(t), v_p(t) - v_i(t)) & \cdots \text{following traveling} \end{cases} \quad (58)$$

Further, $\omega_i$ is a parameter representative of a time constant (inverse number) of the vehicle speed control of other vehicle i, $v_i^*$ is a predicted target vehicle speed of other vehicle i, and $X_P(t)$ and $V_P(t)$ are coordinates indicative of a position and a vehicle speed of a preceding vehicle traveling ahead of other vehicle i on the same lane. For example, in case of FIG. 4, other vehicle 11 corresponds to a preceding vehicle of other vehicle 12. Since no preceding vehicle of other vehicles 11 and 13 is found, it is determined that other vehicles 11 and 13 are not put in a following travel condition. A function $v_i^f(R, R_v)$ is a modeled function of a target vehicle speed of a vehicle which produces an inter-vehicle distance R and a relative speed $R_v$ relative to the preceding vehicle. It is possible to utilize a control algorism constructed by the following expressions (E3) and (E4), Table 1 representing a relationship among a natural frequency of an inter-vehicle distance control, an inter-vehicle distance difference ΔL and a relative speed ΔV, and Table 2 representing a relationship among a damping coefficient of the inter-vehicle distance control, the inter-vehicle distance difference ΔL and the relative speed ΔV, which are disclosed in Japanese Published Patent Application No. 2000-135934.

$$V_t = V + \Delta V \quad (E3)$$

where $V_t$ is a vehicle speed of a preceding vehicle.

$$V^* = V(t) + \Delta V(t) - [fv\{\Delta V_T(t) - \Delta V(t)\} + fL\{L_T - L(t)\}] \quad (E4)$$

As an evaluation function of mathematically evaluating the control input of host vehicle 10, the following function (59) is employed.

$$J[u_x, u_y] = \int_t^{t+T} L(X(\tau), u_x, (\tau), u_y(\tau)) d\tau \quad (59)$$

where T represents a length of the period of producing the recommended control input, and a function L is a function of evaluating the control input during the recommended control input generating period and the state thereof. X is a state quantity of the system, and in case of FIG. 4, the state quantity X is represented by the following expression (60).

$$X = (x_0 v_0 y_0 \ldots x_3 v_3 y_3) \quad (60)$$

Recommended control input producing period T has to be set at a value to be long as the driver can recognize it as a pattern of the control input and to be short as the accuracy of the estimation is not so degraded thereby. Therefore, it is substantially set at several seconds.

The evaluation expression L is constructed by the sum of four functions which represent a first limitation of traveling at the target vehicle speed as possible, a second limitation of preventing a large acceleration/deceleration as possible, a third limitation of avoiding the lane change to be frequently executed, and a fourth limitation of avoiding host vehicle from excessively approaching surrounding vehicles, respectively.

As a function representing the first limitation, the following function (61) is employed.

$$L_v(v_0) = \frac{w_v}{2}(v_0 - v_0^*)^2 \quad (61)$$

where $w_v$ is a positive constant representing an evaluation weight relative to the first limitation, $v_0^*$ is the target vehicle speed calculated by the target vehicle speed calculating means.

As a function representing the second limitation, the following function (62) is employed.

$$L_x(u_x) = \frac{w_x}{2}u_x^2 \quad (62)$$

where $w_x$ is a positive constant representing an evaluation weight relative to the second limitation.

As a function representing the third limitation, the following function (63) is employed.

$$L_y(u_y, y_0) = \frac{w_y}{2}(u_y - y_0)^2 \quad (63)$$

where $w_y$ is a positive constant representing an evaluation weight relative to the third limitation.

In order to express the fourth limitation, an evaluation criteria for evaluating a risk relative to surrounding vehicles is employed. As an evaluation criteria, a headway time (inter-vehicle distance/vehicle speed of a following vehicle) and a collision time (inter-vehicle distance/relative speed) are known. The evaluation function (59) is constructed such that smaller the value becomes higher the evaluation becomes. Accordingly, inverse values of the headway time and the collision time are used. The following expression (64) is used as an evaluation expression of the preceding vehicle ahead of host vehicle 10 on the traveling lane, and the following expression (65) is used as an evaluation expression of a rearward vehicle of host vehicle on the traveling lane.

$$L_f(x_f, v_f) = \alpha \cdot \frac{v_r}{x_f - x_0} + (1 - \alpha) \cdot \frac{v_0 - v_f}{x_f - x_0} \cdot \frac{1}{1 + \exp(-\beta(v_0 - v_f))} \quad (64)$$

$$L_r(x_r, v_r) = \alpha \cdot \frac{v_r}{x_0 - x_r} + (1 - \alpha) \cdot \frac{v_r - v_0}{x_0 - x_r} \cdot \frac{1}{1 + \exp(-\beta(v_r - v_0))} \quad (65)$$

where $x_f$ and $v_f$ are a position and a vehicle speed of the preceding vehicle (frontward vehicle), $x_r$ and $v_r$ are a position and a vehicle speed of the rearward vehicle, $\alpha$ is a constant which is for the weights of the headway time and the collision time and takes a value ranging form 0 to 1, and $\beta$ is a positive constant of determining a shape of a saturation factor employed to limit a lower side of the evaluation function.

In the case of FIG. 4, when host vehicle 10 is traveling on a left side lane, other vehicle 13 is a preceding vehicle (frontward vehicle). When host vehicle 10 executed the lane change to gap G1 of a right side lane, other vehicle 11 is a preceding vehicle and other vehicle 12 is a rearward vehicle. After host vehicle 10 changed the traveling lane to the right side lane, other vehicles 11 and 12 are evaluated. Accordingly, the fourth limitation is constructed by combining the expressions (64) and (65) and represented by the following expression (66).

$$L_s(X) = c_L(y_0) \cdot w_3 \cdot L_f(x_3, v_3) + c_R(y_0) \cdot (w_1 \cdot L_f(x_1, v_1) + w_2 \cdot L_f(x_2, v_2)) \quad (66)$$

where $w_1$, $w_2$ and $w_3$ are positive constants representative of weights of other vehicles 11, 12 and 13, respectively, and function $C_L(y)$ and $C_R(y)$ are represented as follows.

$$c_L(y_0) = \begin{cases} 0 & \cdots \quad y_0 < -\frac{1}{2} \\ \frac{1}{2} + \frac{1}{2}\sin(\pi \cdot y_0) & \cdots \quad -\frac{1}{2} \leq y_0 \leq \frac{1}{2} \\ 1 & \cdots \quad \frac{1}{2} < y_0 \end{cases} \quad (67)$$

$$c_R(y_0) = \begin{cases} 1 & \cdots \quad y_0 < -\frac{1}{2} \\ \frac{1}{2} - \frac{1}{2}\sin(\pi \cdot y_0) & \cdots \quad -\frac{1}{2} \leq y_0 \leq \frac{1}{2} \\ 0 & \cdots \quad \frac{1}{2} < y_0 \end{cases} \quad (68)$$

In case that host vehicle changes the lane to other gap, the evaluation expression is constructed according to the relationship with frontward and rearward vehicles of host vehicle 10 in the same manner as discussed above.

The evaluation expression L is constructed by the sum of the expressions (61), (62), (63) and (66) as follows.

$$L(X, u_x, u_y) = L_v(v_0) + L_{xv}(u_x) + L_y(u_y, y_0) + L_s(X) \quad (69)$$

As discussed above, by defining the prediction expressions (52) through (58) and the evaluation function (59), it becomes possible to calculate the control inputs $u_x$ and $u_y$ of minimizing the evaluation function as time-series signals during a period from a present time T to a future time that the period T elapsed from the time t.

At step S208 processing unit 3 generates an output signal and outputs the signal to display unit 4.

Figure 19B:
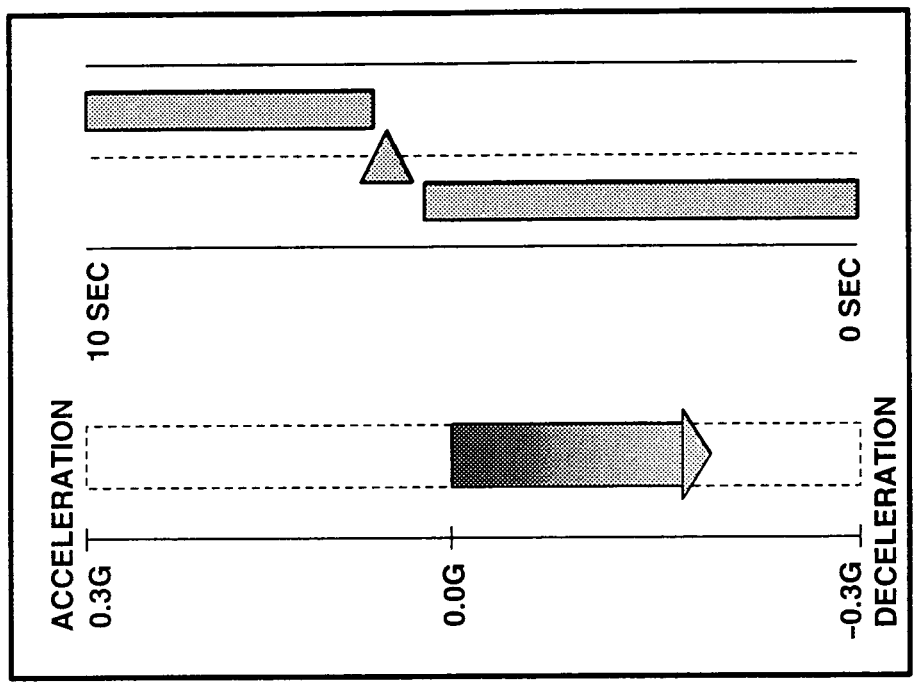
FIG. 19B is a displayed example displayed by the display unit of the third embodiment.
Figure 19A:
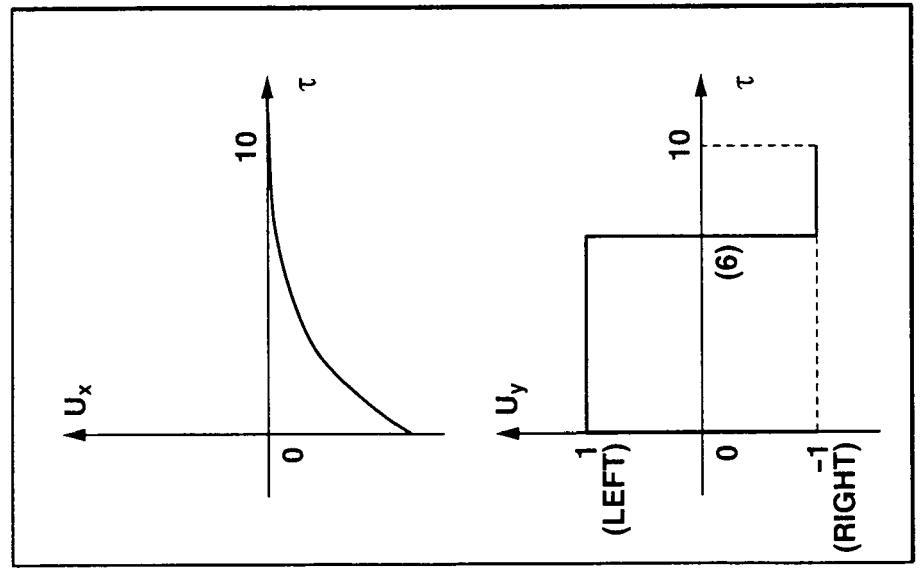
FIG. 19A is a graph showing recommended control inputs produced by the lane change assist system of the third embodiment.

Display unit 4 displays the information according to the display command signal sent from processing unit 3. FIG. 19A shows the generated recommended control inputs generated in the situation that host vehicle is put in the condition shown in FIG. 4 and the target vehicle speed was selected from the appropriate speed range for gap G2. FIG. 19B shows a display content displayed by display unit 4 in this situation.

In this situation, the target vehicle speed of host vehicle 10 is set at a value lower than the present host vehicle speed. Processing unit 3 calculates the recommended control input based on the target vehicle speed and generates a pattern of the control input for host vehicle 10 in the concrete form. As a result, processing unit 3 produces the pattern that host vehicle 10 is decelerated and changes the traveling lane to the right side lane 6 seconds later, as shown in FIG. 19A. Further, display unit 4 displays a command value of recommended control input $u_x$ in the form of a bar graph vertically extended from a center of acceleration 0 at the left hand side of the displayed image, as shown in FIG. 19B. Since the deceleration is commended, a bar directed in the downward direction is displayed on display unit 3. The lane change execution pattern based on $u_y$ is shown at the right hand side of the image displayed by display unit 4 as shown in FIG. 19B.

As discussed above, the lane change assist system of the third embodiment according to the present invention comprises the vehicle-group behavior predicting means for predicting a future behavior of host vehicle 10 and surrounding vehicles, the control input evaluating means for mathematically evaluating the properness of the manipulation of host vehicle 10 from the predicted surrounding vehicle group behavior due to the manipulation of host vehicle 10, the recommended control input producing means for calculating a desired acceleration/deceleration manipulation and a pattern of a lane change operation of host vehicle 10 using the vehicle group behavior predicting means and the control input evaluating means. Further, the control input evaluating means has an evaluation criterion that it is preferable that a difference between is the host vehicle speed of host vehicle 10 and the set vehicle speed (which is of a controllable parameter). The set vehicle speed of the control input evaluating means is set at the target vehicle speed calculated by the target vehicle speed setting means 3d. The recommended control input producing means 3e includes the vehicle group behavior predicting means and the control input evaluating means.

Since the recommended control input producing means 3e converts the target vehicle speed to the pattern showing the change of acceleration from the present vehicle speed to the target vehicle speed and the pattern showing the lane change which indicates concrete control inputs, the lane change assist system can provide the concrete assist information to the driver. By producing and displaying the recommendation directly related to the manipulation of host vehicle 10, it becomes possible to provide the concrete and intuitive assist information to the driver. Therefore, the lane change assist system of the third embodiment according to the present invention executes the effective assist of the lane change.

This application is based on Japanese Patent Application No. 2004-146299 filed on May 17, 2004 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A lane change assist system comprising:
a host vehicle state detecting device configured to detect a traveling condition of a host vehicle;
a surrounding vehicle detecting device configured to detect a plurality of other vehicles located around the host vehicle;
a lane detecting device configured to detect a lane in which the host vehicle is traveling; and
a processing unit configured to
set a target lane for a lane change,
determine a start and an ending of a lane change assist,
set a predicted period for an evaluation of the lane change to the target lane,
determine locations of a plurality of gaps around at least one of the plurality of other vehicles that is located in the target lane,
obtain a plurality of appropriate speed ranges, at least one appropriate speed range for each of the plurality of gaps, and
select a target vehicle speed of the host vehicle from the plurality of appropriate speed ranges.

2. The lane change assist system as claimed in claim 1, further comprising a turn indicator configured to be manipulated by a driver of the host vehicle, wherein the processing unit is further configured to determine the target lane, and the start and ending of the predicted period, on the basis of a signal output from the turn indicator.

3. A lane change assist system comprising:
a host vehicle state detecting device that detects a traveling condition of a host vehicle;
a surrounding vehicle detecting device that detects other vehicle located around the host vehicle;
a lane detecting device that detects a lane around the host vehicle;
a processing unit arranged
to set a target lane, to which the host vehicle changes a traveling lane from the detected lane,
to determine a start and an ending of a lane change assist,
to set a predicted period for an evaluation of a lane change to the target lane, on the basis of a prediction,
to obtain an appropriate speed range in which the host vehicle executes the lane change during the predicted period for each of gaps between other vehicles traveling on the target lane, and
to select a target vehicle speed of the host vehicle from the appropriate speed range; and
a lane decreased point detecting device that detects a lane decreased point at which a number of lanes ahead of the host vehicle is decreased, the lane decreased point detecting device sends information indicative of a distance between the host vehicle and the lane decreased point and a lane decreased at the lane decreased point, wherein the processing unit sets an adjacent lane as the target lane and starts the lane change assist when the host vehicle is put in a forcible lane change condition in which the distance between the host vehicle and the lane decreased point is smaller than a predetermined distance and the lane on which the host vehicle travels is the decreased lane, and the processing unit is further arranged to terminate the lane change assist when a determination is made that a lane change to the target lane has been completed.

4. The lane change assist system as claimed in claim 3, wherein the processing unit is further arranged to set an end of the predicted period at a time at which a predetermined target time period elapsed from a time that the lane change assist is started and to extend the end of the predicted period when the forcible lane change condition is not satisfied.

5. The lane change assist system as claimed in claim 3, wherein the processing unit is further arranged to set an end of the predicted period at a predicted time at which the host vehicle will reach a point short of the lane decreased point by a predetermined distance.

6. The lane change assist system as claimed in claim 1, wherein the processing unit is further configured to:
obtain the appropriate speed range for each of the gaps on the basis of an inter-vehicle distance and a relative speed between the host vehicle and a vehicle producing the corresponding gap on the target lane, and
eliminate at least a portion of at least one of the appropriate speed ranges on the basis of an inter-vehicle distance and a relative speed between the host vehicle and a preceding vehicle ahead of the host vehicle on the traveling lane.

7. The lane change assist system as claimed in claim 1, wherein the processing unit is further configured to eliminate at least a portion of at least one of the appropriate speed ranges on the basis of an upper limit and a lower limit which are previously set.

8. The lane change assist system as claimed in claim 1, wherein the processing unit is further configured to set the target vehicle speed on the basis of at least a criterion that a difference between the host vehicle speed and the target vehicle speed is small.

9. The lane change assist system as claimed in claim 1, wherein the processing unit is further configured to set the appropriate speed range at a speed range by which the host vehicle avoids an excessive approach to a preceding vehicle ahead of the host vehicle on the traveling lane and to select the target vehicle speed from the set appropriate speed range when the appropriate speed range is not found and a forcible lane change condition of requesting a forcible lane change is not satisfied.

10. The lane change assist system as claimed in claim 3, wherein the processing unit is further arranged to set the target vehicle speed at a vehicle speed by which the host vehicle stops short of the lane decreased point by a deceleration smaller than a predetermined value when the appropriate speed range is not found and a forcible lane change condition of requesting a forcible lane change is satisfied.

11. The lane change assist system as claimed in claim 1, further comprising an alarm device for generating an alarm for a driver of the host vehicle, the alarm device generating the alarm when the appropriate speed range is not found.

12. The lane change assist system as claimed in claim 1, further comprising a display unit for displaying the target vehicle speed, the display unit displaying the target vehicle speed calculated by the processing unit.

13. The lane change assist system as claimed in claim 1, further comprising a vehicle speed control system for controlling the host vehicle speed at a speed-control target vehicle speed, the vehicle speed control system employing the target vehicle speed as the speed-control target vehicle speed.

14. A lane change assist system comprising:
a host vehicle state detecting device that detects a traveling condition of a host vehicle;
a surrounding vehicle detecting device that detects other vehicle located around the host vehicle;
a lane detecting device that detects a lane around the host vehicle; and
a processing unit arranged
to set a target lane, to which the host vehicle changes a traveling lane from the detected lane,
to determine a start and an ending of a lane change assist,
to set a predicted period for an evaluation of a lane change to the target lane, on the basis of a prediction,
to obtain an appropriate speed range in which the host vehicle executes the lane change during the predicted period for each of gaps between other vehicles traveling on the target lane, and
to select a target vehicle speed of the host vehicle from the appropriate speed range;
wherein the processing unit is further arranged to predict future behaviors of the host vehicle and other vehicle around the host vehicle to mathematically evaluate a control input of the host vehicle from the future behaviors produced by the control input, to obtain a pattern of a recommended acceleration/deceleration manipulation of the host vehicle and a pattern of a lane change operation of the host vehicle from the predicted future behaviors and future vehicle group behaviors and the evaluation of the control input,
wherein the processing unit is further arranged to have an evaluation criterion of evaluating a set vehicle speed of a controllable parameter from a smallness of a difference between the host vehicle speed and the set vehicle speed, and to set the set vehicle speed as the target vehicle speed.

15. A method of assisting a lane change of a host vehicle, comprising:
detecting a traveling condition of a host vehicle;
detecting a plurality of other vehicles located around the host vehicle;
detecting a lane in which the host vehicle is traveling;
executing a setting of a target lane for a lane change and a determination of a start and an ending of a lane change assist;
setting a predicted period for an evaluation of the lane change to the target lane;
determining locations of a plurality of gaps around at least one of the plurality of other vehicles that is located in the target lane,
obtaining a plurality of appropriate speed ranges, at least one appropriate speed range for each of the plurality of gaps; and
selecting a target vehicle speed of the host vehicle from the plurality of appropriate speed ranges.

16. A lane change assist system comprising:
host vehicle state detecting means for detecting a traveling condition of a host vehicle;
surrounding vehicle detecting means for detecting a plurality of other vehicles located around the host vehicle;
lane detecting means for detecting a lane in which the host vehicle is traveling;
assist operation controlling means for executing setting a target lane for a lane change determining a start and an ending of a lane change assist;
predicted period setting means for setting a predicted period for an evaluation of the lane change to the target lane;
appropriate speed range calculating means for determining locations of a plurality of gaps around at least one of the plurality of other vehicles that is located in the target lane, and obtaining a plurality of appropriate speed ranges, at least one appropriate speed range for each of the plurality of gaps; and
target speed setting means for selecting a target vehicle speed of the host vehicle from the plurality of appropriate speed ranges.

* * * * *